US011372703B1

(12) United States Patent
Liberty et al.

(10) Patent No.: US 11,372,703 B1
(45) Date of Patent: Jun. 28, 2022

(54) REDUCED SYSTEM MEMORY LATENCY VIA A VARIABLE LATENCY INTERFACE

(71) Applicant: INTERNATIONAL BUSINESS MACHINES CORPORATION, Armonk, NY (US)

(72) Inventors: John Samuel Liberty, Round Rock, TX (US); Brad William Michael, Cedar Park, TX (US); Stephen J. Powell, Austin, TX (US); Nicholas Steven Rolfe, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 17/180,150

(22) Filed: Feb. 19, 2021

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/0745* (2013.01); *G06F 11/0751* (2013.01); *G06F 13/1668* (2013.01); *G06F 13/4027* (2013.01)

(58) Field of Classification Search
CPC .............. G06F 11/0703; G06F 11/073; G06F 11/0745; G06F 11/0751; G06F 11/0772;
(Continued)

(56) References Cited

U.S. PATENT DOCUMENTS 6,070,231 A * 5/2000 Ottinger .............. G06F 12/0828
711/144
6,240,458 B1 * 5/2001 Gilbertson .............. G06F 13/14
710/39

(Continued)

OTHER PUBLICATIONS

M. Daneshtalab, M. Ebrahimi, P. Liljeberg, J. Plosila and H. Tenhunen, "Memory-Efficient On-Chip Network With Adaptive Interfaces," in IEEE Transactions on Computer-Aided Design of Integrated Circuits and Systems, vol. 31, No. 1, pp. 146-159, Jan. 2012, doi: 10.1109/TCAD.2011.2160348. (Year: 2012).*

(Continued)

*Primary Examiner* — Anthony J Amoroso
(74) *Attorney, Agent, or Firm* — Brian F. Russell; Nathan Rau

(57) ABSTRACT

A memory controller receives, via a first interface, a first read request requesting a requested data granule. Based on receipt of the first read request, the memory controller transmits, via a second interface, a second read request to initiate access of the requested data granule from a system memory. Based on a determination to schedule accelerated data delivery and receipt by the memory controller of a data scheduling indication that indicates a timing of future delivery of the requested data granule, the memory controller requests, prior to receipt of the requested data granule, permission to transmit the requested data granule on the system interconnect fabric. Based on receipt of the requested data granule at the indicated timing and a grant of the permission to transmit, the memory controller initiates transmission of the requested data granule on the system interconnect fabric and transmits an error indication for the requested data granule.

19 Claims, 18 Drawing Sheets

(51) Int. Cl.
*G06F 13/16* (2006.01)
*G06F 13/40* (2006.01)

(58) Field of Classification Search
CPC .... G06F 13/14; G06F 13/1605; G06F 13/161;
G06F 13/1668; G06F 13/1684; G06F
13/1689; G06F 13/20; G06F 13/4027
See application file for complete search history.

(56) References Cited

U.S. PATENT DOCUMENTS

| | | |
|---|---|---|
| 8,539,129 B2 | 9/2013 | Wang |
| 9,405,550 B2 | 8/2016 | Biran et al. |
| 9,658,963 B2 | 5/2017 | Morris et al. |
| 2006/0143403 A1* | 6/2006 | Barrett ................ G06F 12/0817 |
| | | 711/E12.027 |
| 2019/0138630 A1 | 5/2019 | Drerup et al. |
| 2020/0050396 A1* | 2/2020 | Keil .................... G06F 13/1621 |

OTHER PUBLICATIONS

Fang, J., Mulder, Y. T., Hidders, J., Lee, J., & Hofstee, H. P. (2020). In-memory database acceleration on FPGAs: a survey. The VLDB Journal, 29(1), 33-59.

Morgan, T. P. (Sep. 3, 2020). The Memory Area Network at the Heart of IBM's Power10. Retrieved from https://www.nextplatform.com/2020/09/03/the-memory-area-network-at-the-heart-of-ibms-power10/.

Boekholt, S. (2018) CAPI enablement for FPGA acceleration. Retrieved from https://indico-jsc.fz-juelich.de/event/60/session/3/contribution/2/material/slides/1.pdf.

Microchip Technology Incorporated. (2019). SMC1001 8×25G: OMI DDR4 Enterprise Memory Controller. Retrieved from http://ww1.microchip.com/downloads/en/DeviceDoc/00003088A.pdf.

* cited by examiner

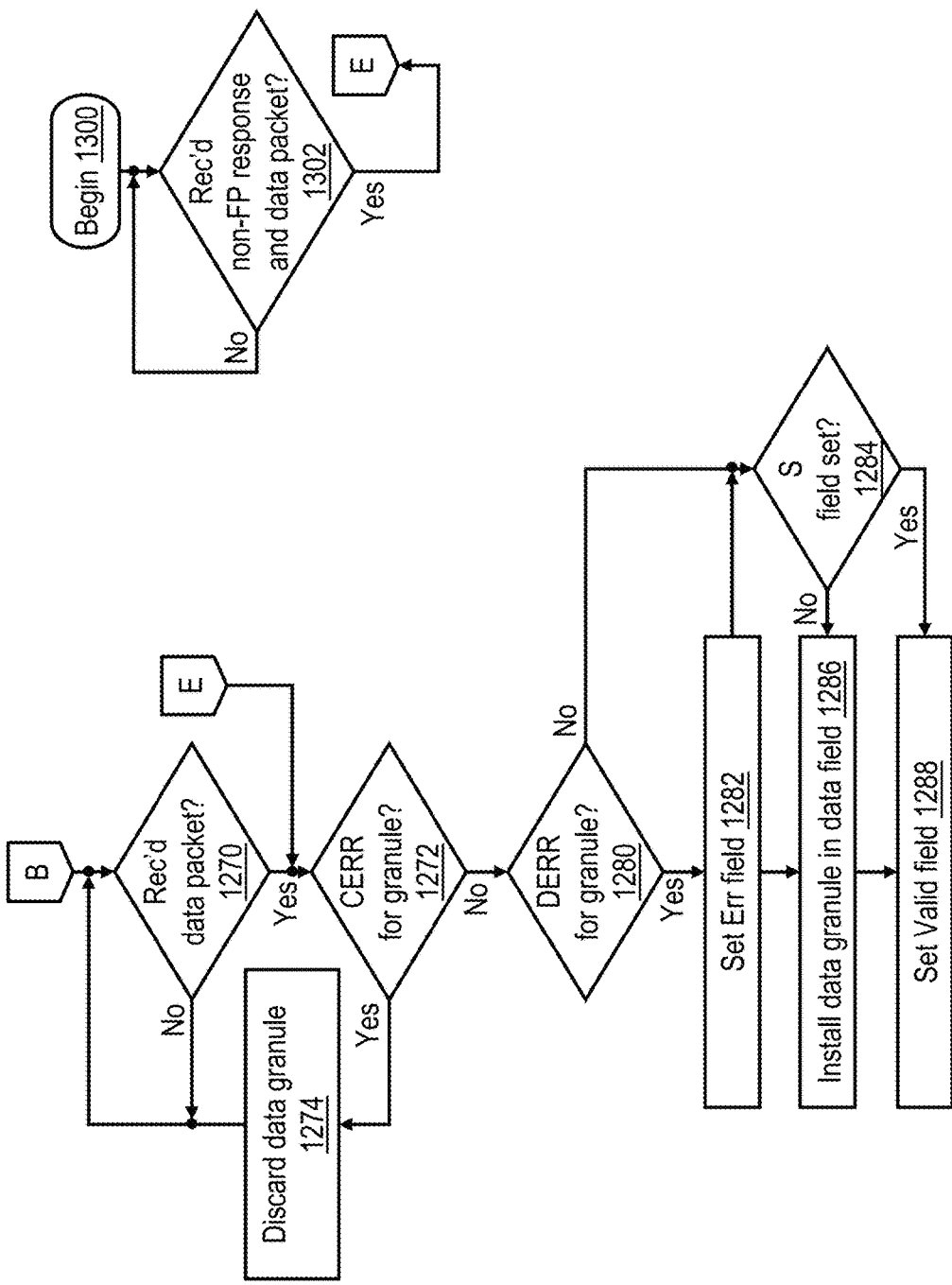

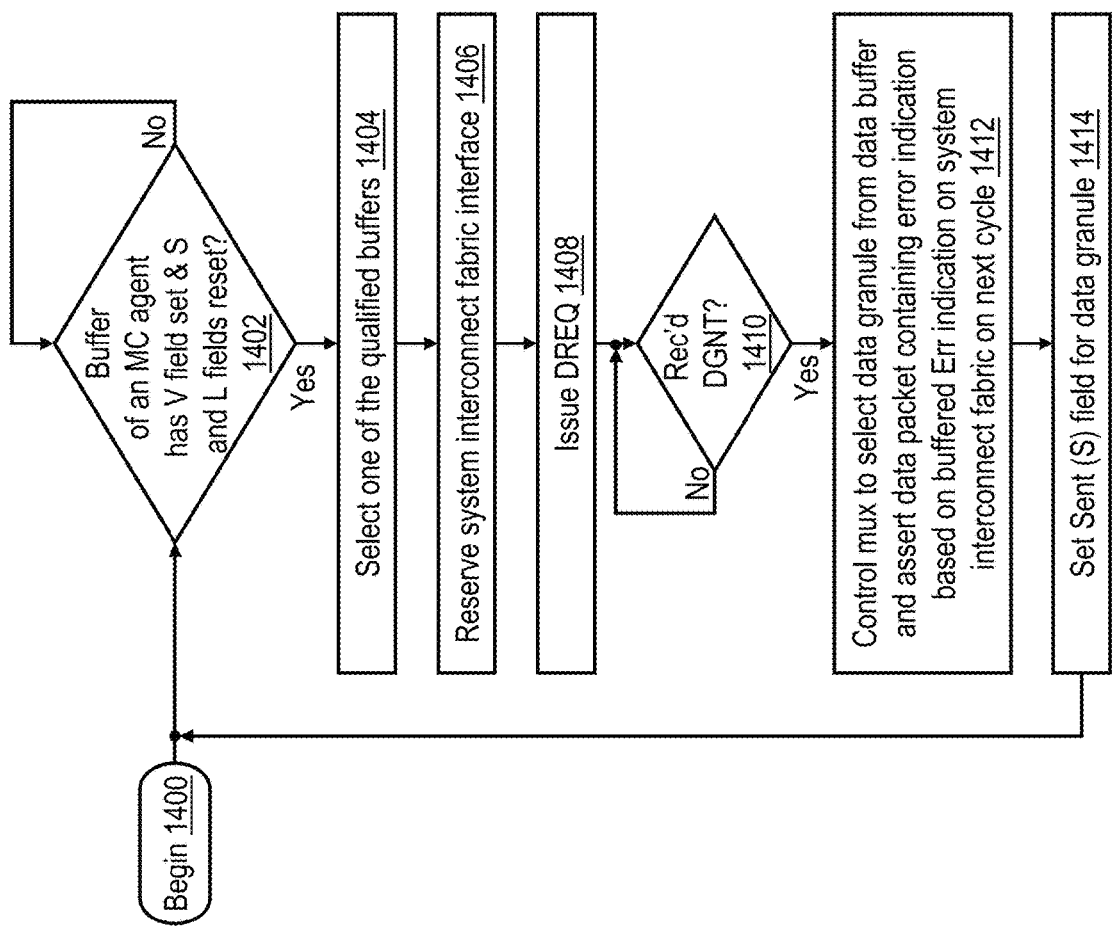

REDUCED SYSTEM MEMORY LATENCY VIA A VARIABLE LATENCY INTERFACE

BACKGROUND OF THE INVENTION

The present invention relates generally to data processing and, in particular, to accesses to the distributed shared memory system of a data processing system.

A conventional multiprocessor (MP) computer system, such as a server computer system, includes multiple processing units, each including one or more processor cores. The processing units are all coupled to an interconnect fabric, which typically comprises one or more address, data and control buses. Coupled to the interconnect fabric are one or more system memories, which together represent the lowest level of processor-addressable memory in the multiprocessor computer system and which are generally accessible for read and write access by all processing units. In order to reduce access latency to instructions and data residing in the system memory, each processing unit is typically further supported by a respective multi-level vertical cache hierarchy.

Cache memories are commonly utilized to temporarily buffer memory blocks that might be accessed by a processor core in order to speed up processing by reducing access latency introduced by having to load needed data and instructions from system memory. In some MP systems, the vertical cache hierarchy associated with each processor core includes at least two levels, referred to as level one (L1) and level two (L2) caches. The L1 (or upper-level) cache is usually a private cache associated with a particular processor core and cannot be accessed by other cores in an MP system. In some cases, the vertical cache hierarchy associated with a given processor core may include additional lower levels, such as a level three (L3) cache.

BRIEF SUMMARY

To support high performance, it is desirable for data processing systems to reduce or minimize access latency. With reasonably sized caches and intelligent cache management policies, a high percentage of memory access requests of typical computational workloads can be satisfied from cache memory, resulting in relatively low average access latency. However, the small percentage of memory access requests that cannot be satisfied from cache memory are subject to the much greater access latency of system memory, which can be order(s) of magnitude greater than that of cache memory. The present disclosure describes a technique of reducing the access latencies of read requests satisfied from system memory.

In at least one embodiment, a memory controller provides access to a system memory of a data processing system including a system interconnect fabric coupling a plurality of processing units to the memory controller. The memory controller receives, from the system interconnect fabric via a first interface, a first read request by which a processing unit among the plurality of processing units requests a copy of a requested data granule. Based on receipt of the first read request via the first interface, the memory controller transmits a second read request via a second interface to initiate access of the requested data granule from a system memory coupled to the memory controller. Based on a determination to schedule accelerated data delivery and receipt by the memory controller via the second interface of a data scheduling indication that indicates a timing of future delivery of the requested data granule, the memory controller, prior to receipt via the second interface of the requested data granule, requests permission to transmit the requested data granule on the system interconnect fabric. Based on receipt of the requested data granule via the second interface at the timing indicated by the data scheduling indication and a grant of the permission to transmit the requested data granule, the memory controller initiates transmission of the requested data granule on the system interconnect fabric via the first interface and transmits, on the system interconnect fabric, an error indication for the requested data granule.

BRIEF DESCRIPTION OF THE SEVERAL VIEWS OF THE DRAWINGS

FIGS. 12A-12C together form a high-level logical flowchart of an exemplary process by which a memory controller handles FP response packets and FP data packets issued by a buffer chip while operating in a fastpath mode in accordance with one embodiment;

FIG. 13 is a high-level logical flowchart of an exemplary process by which a memory controller handles a data granule returned by a buffer chip while operating in a non-fastpath mode in accordance with one embodiment;

FIG. 14 is a high-level logical flowchart of an exemplary process by which a memory controller returns data from a data buffer to a requestor via the system interconnect fabric in accordance with one embodiment;

DETAILED DESCRIPTION

Figure 1:
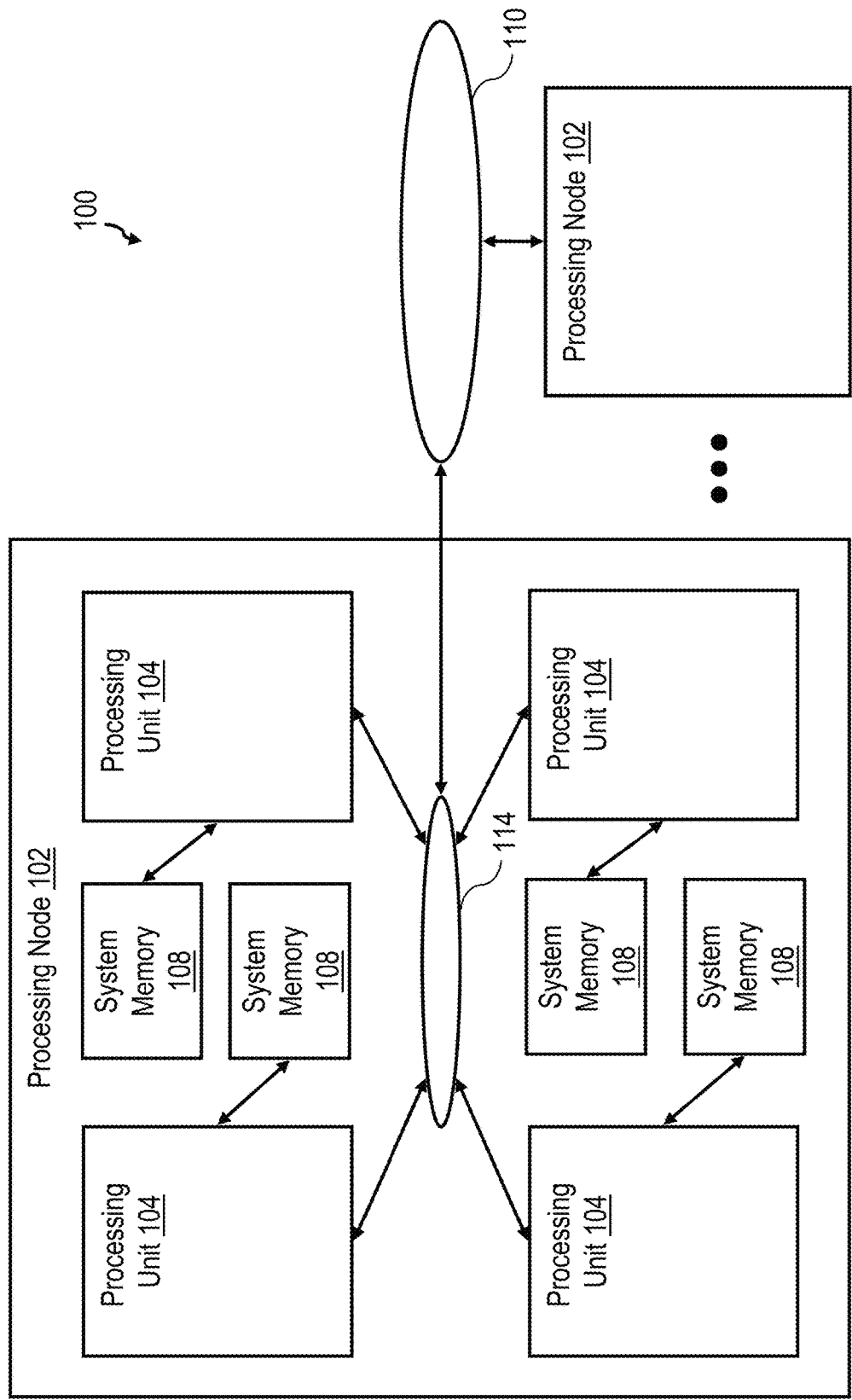
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high-level block diagram depicting an exemplary data processing system 100 in accordance with one embodiment. In the depicted embodiment, data processing system 100 is a cache-coherent symmetric multiprocessor (SMP) data processing system including multiple processing nodes 102 for processing data and instructions. Processing nodes 102 are coupled to a system interconnect 110 for conveying address, data, and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104, each preferably realized as a respective integrated circuit, which includes a semiconductor substrate in which integrated circuitry is formed as is known in the art. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system interconnect fabric. In at least some embodiments, the bandwidth on the system interconnect fabric is allocated by an unillustrated arbiter based on requests presented by participants coupled to the system interconnect fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached, and modified by a processor core in any processing unit 104 of any processing node 102 within data processing system 100. System memories 108 thus form the lowest level of processor-addressable storage in the distributed shared memory system of data processing system 100. In alternative embodiments, one or more memory controllers 106 (and system memories 108) can be coupled to system interconnect 110 rather than to a local interconnect 114.

Those skilled in the art will appreciate that SMP data processing system 100 of FIG. 1 can include many additional non-illustrated components, such as interconnect bridges, additional storage devices, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache-coherent data processing systems of diverse architectures and are in no way limited to the generalized data processing system architecture illustrated in FIG. 1.

Figure 2:
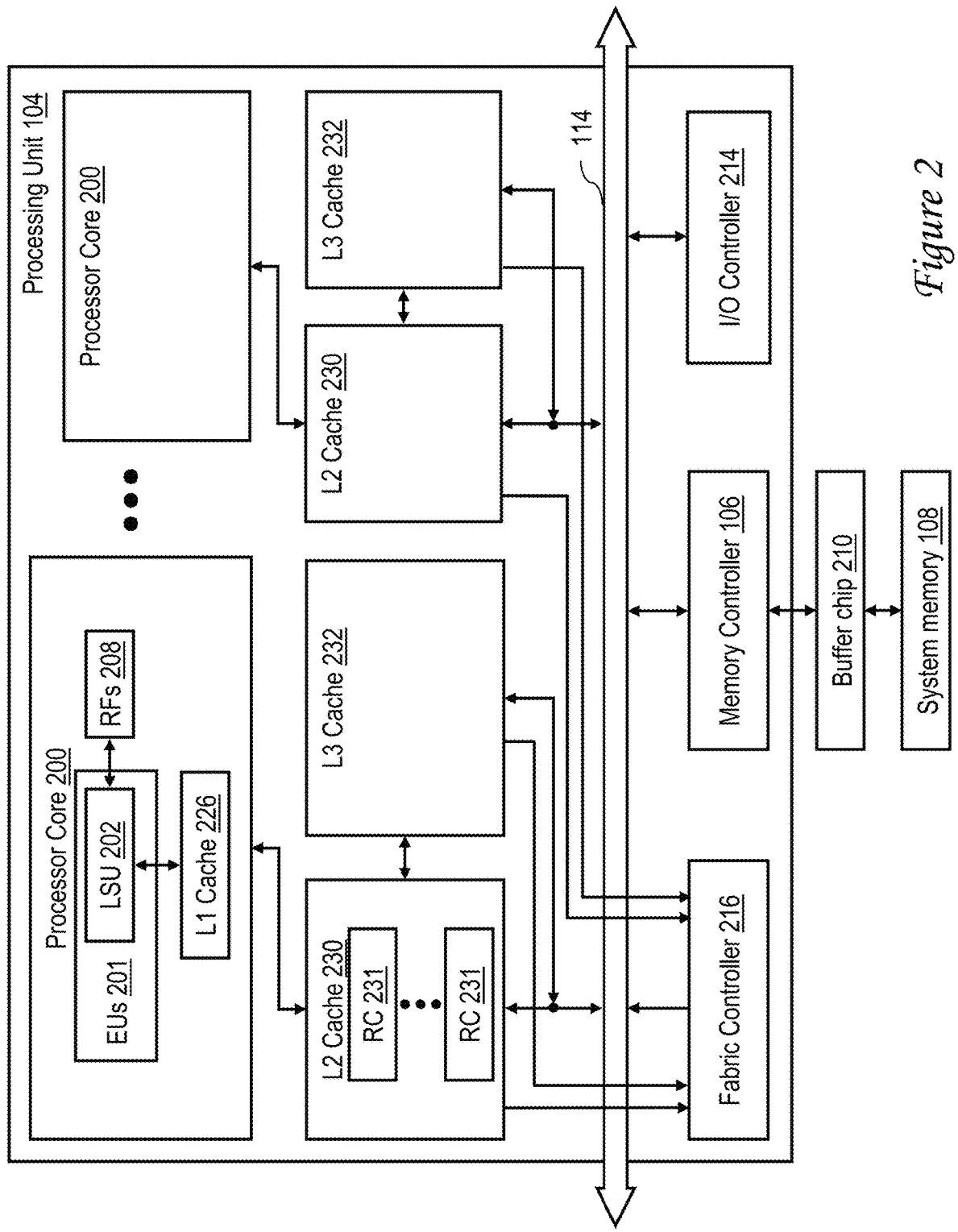
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two or more processor cores 200 for processing instructions and data. In some embodiments, each processor core 200 is capable of independently executing multiple simultaneous hardware threads of execution.

As depicted, each processor core 200 includes one or more execution units (EUs) 201, such as a load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and updates to memory blocks specified by store accesses are written to the distributed shared memory system from the one or more register files 208.

The operation of processor cores 200 is supported by a multi-level memory hierarchy having at its lowest level shared system memories 108. Each system memory 108 can comprise, for example, a plurality of memory chips implemented in one or more memory technologies, such as dynamic random-access memory (DRAM), magnetoresistive random-access memory (MRAM), flash memory, etc. In the illustrated example, system memory 108 is accessed by its respective associated memory controller 106 via a buffer chip 210 interposed between the memory controller 106 and system memory 108. Memory controllers 106 and buffer chips 210 are described in greater detail below with reference to FIG. 3.

At its upper levels, the multi-level memory hierarchy includes a respective vertical cache hierarchy associated with each processor core 200. In the illustrative embodiment, this vertical cache hierarchy includes a store-through level-one (L1) cache 226 within and private to each processor core 200, a store-in level-two (L2) cache 230, and a lookaside level-three (L3) victim cache 232. Each L3 victim cache 232 can be populated, at least in part, with cache lines evicted from the L2 caches 230 of the same or different processing units 104. Each L2 cache 230 and L3 cache 232 is further coupled to local interconnect 114 and to a fabric controller 216 to facilitate participation of caches 230, 232 in the coherent data communication on the system interconnect fabric of data processing system 100. Although the illustrated cache hierarchies include only three levels of cache, those skilled in the art will appreciate that alternative embodiments may include additional levels (L4, etc.) of on-chip or off-chip, private or shared, in-line or lookaside cache, which may be fully inclusive, partially inclusive, or non-inclusive of the contents the upper levels of cache. In the illustrated example, each L2 cache 230 includes a plurality of read-claim (RC) machines 231, each of which is capable of independently and concurrently servicing a memory access request of the associated processor core 200.

Each processing unit 104 further includes an integrated and distributed fabric controller 216 responsible for controlling the flow of operations on the system interconnect fabric comprising local and system interconnects 110, 114 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access (e.g., load-type or store-type) instruction requesting a specified memory access operation to be performed, LSU 202 executes the memory access instruction to determine the target address (e.g., an effective address) of the memory access request. After translation of the target address to a real address, the directory of L1 cache 226 is accessed utilizing the real address. Assuming the directory lookup indicates the memory access request cannot be satisfied solely by reference to L1 cache 226, the processor core 200 then transmits the memory access request, which includes at least a request type (e.g., read or write) and the target real address, to its affiliated L2 cache 230 for servicing. In servicing the memory access request, L2 cache 230 may access its associated L3 cache 232 and/or initiate an interconnect operation (e.g., read request or write request) corresponding to the memory access request on the system interconnect fabric.

Figure 3:
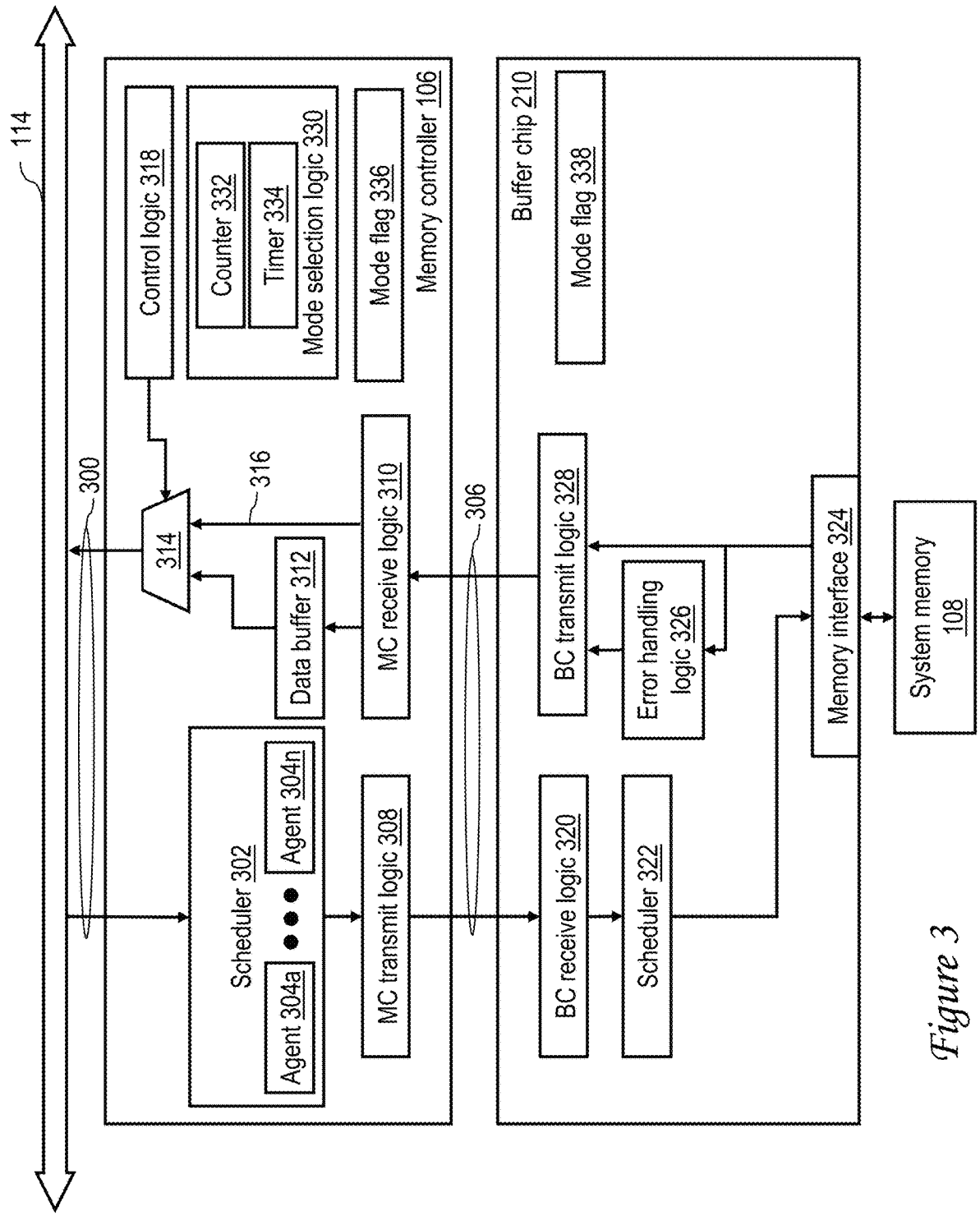
FIG. 3 is a more detailed block diagram of the memory controller and buffer chip of FIG. 2 in accordance with one embodiment.

With reference now to FIG. 3, there is illustrated a more detailed block diagram of an exemplary memory controller 106 and buffer chip 210 in accordance with one embodiment. As shown in FIG. 3, memory controller 106 has first interface 300 that can be coupled to the system interconnect fabric (e.g., to a local interconnect 114). Memory controller 106 includes a scheduler 302 having a plurality of agents 304a-304n, each configured to independently and concurrently handle a memory access request received by memory controller 106 via first interface 300. Memory controller 106 additionally includes a second interface 306 that can be coupled to a buffer chip 210 interposed between memory controller 106 and system memory 108. Memory controller 106 transmits memory access requests to buffer chip 210 utilizing memory controller (MC) transmit logic 308, and receives data granules responsive to the memory access requests from buffer chip 210 utilizing MC receive logic 310. In some cases described further herein, a data granule received by MC receive logic 310 can be buffered in a data buffer 312, one embodiment of which is described in greater detail below with reference to FIG. 6. In some cases described further herein, MC receive logic 310 can forward a data granule via a fast path 316, bypassing data buffer 312, and present the data granule to selection logic (e.g., a multiplexer 314). Multiplexer 314 selects between data granules available in data buffer 312 and the data granule on fast path 316 for presentation on the system interconnect fabric via first interface 300 based on a control input provided by control logic 318.

In the illustrated embodiment, memory controller 106 additionally includes mode selection logic 330, which determines an operating mode of memory controller 106 and buffer chip 210. Specifically, mode selection logic 330 determines whether memory controller 106 and buffer chip 210 operate in a non-fastpath (non-FP) mode in which accesses to data stored in system memory 108 are subject to relatively higher access latencies or in a fastpath (FP) mode in which access latencies can be reduced at the cost of returning possibly erroneous data to a requesting processing unit 104. In the illustrated example, mode selection logic 330 includes a counter 332 that maintains a counter value reflecting a number of detected data errors attributable to link (e.g., cyclic redundancy code (CRC)) errors and a timer 334 that tracks an error monitoring interval. The current mode of operation selected by mode selection logic 330 is indicated by mode flag 336.

As further illustrated in FIG. 3, the depicted embodiment of buffer chip 210 includes buffer chip (BC) receive logic 320 coupled to receive memory access requests from MC transmit logic 308 and a scheduler 322 configured to schedule read and write accesses to system memory 108 via memory interface 324 based on the memory access requests received by BC receive logic 320. Buffer chip 210 additionally includes a data return path including error handling logic 326 and BC transmit logic 328 that returns data granules accessed from system memory 108 to memory controller 106 via second interface 306. Buffer chip additionally includes a mode flag 338 that indicates the current mode of operation selected by mode selection logic 330 of memory controller 106.

Figure 4A:
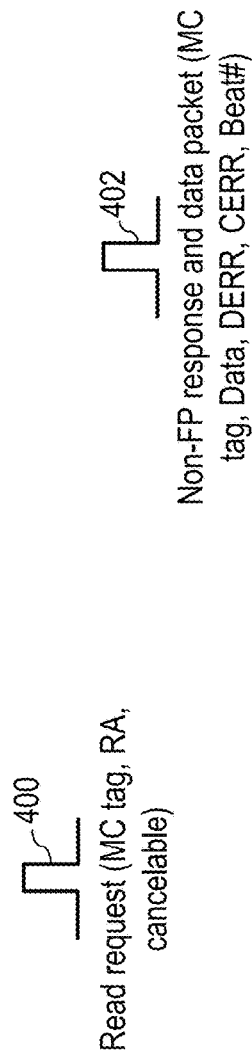
FIG. 4A is a timing diagram illustrating a combined non-fastpath response and data packet on a second interface of a memory controller in accordance with one embodiment.

Referring now to FIG. 4A, there is illustrated a timing diagram showing an exemplary combined non-fastpath response and data packet 400 transmitted by buffer chip 210 to memory controller 106 via second interface 306 in accordance with one embodiment. In this embodiment, an agent 304 in memory controller 106 issues a read request 400 to buffer chip 210 via second interface 306. Read request 400 includes at least an MC tag identifying which agent 304 issued read request 400, a real address specifying the data to be accessed in system memory 108, and an indication of whether or not the read request is cancelable. The application of MC tags to read requests 400 and the associated response packets in this manner enables memory controller 106 to correctly associate read requests 400 with their matching response packets while permitting multiple read requests/response packets to be temporally overlapped and pipelined.

In response to read request 400, buffer chip 210 accesses one or more data granules from system memory 108 and individually returns each such data granule to memory controller 106. For example, in one embodiment, L2 caches 230 may employ 128-byte cache lines, and buffer chip 210 may, in response to a read request, return 128 bytes of data in four 32-byte data granules transmitted in four different beats. If a particular one of the data granules is to be returned in non-FP mode, buffer chip 210 supplies the data granule in a non-FP response and data packet 402. Non-FP response and data packet 402 includes an MC tag identifying which of agents 304a-304n issued the corresponding read request 400, the data granule, an indication of whether the data granule retrieved from system memory 106 contains a data error (DERR), an indication of whether the data has a transient cyclic redundancy code (CRC) error (CERR), and a beat number indicating which of the beat(s) of data is communicated in packet 402. Non-FP response and data packet 402 is discussed further below with reference to block 1114 of FIG. 11.

Figure 4B:
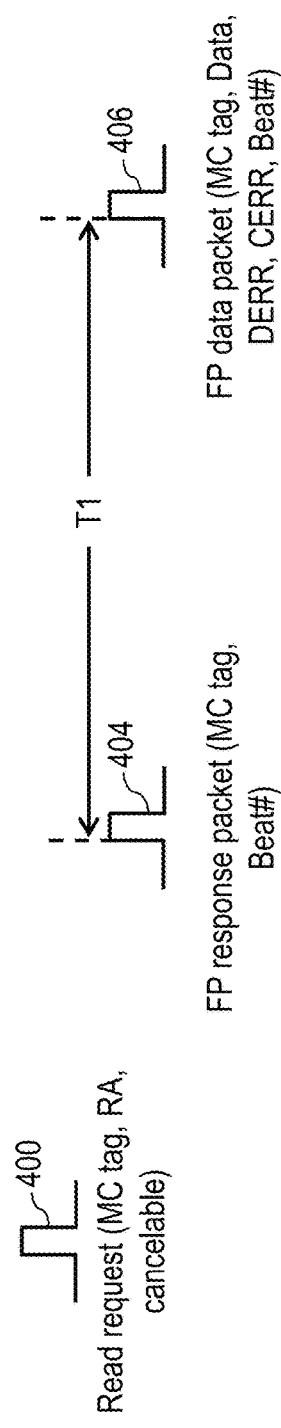
FIG. 4B is a timing diagram illustrating a fastpath response packet and a fastpath data packet on a second interface of a memory controller in accordance with one embodiment.

With reference now to FIG. 4B, there is illustrated a timing diagram showing a FP response packet 404 and a FP data packet 406 transmitted by buffer chip 210 to memory controller 106 via second interface 306 in accordance with one embodiment. If a particular one of the data granules requested by a read request 400 is to be returned in FP mode, buffer chip 210 first issues to memory controller 106 a FP response packet 404 providing an advanced data scheduling indication that indicates the data granule will subsequently be returned to memory controller 106 in a FP data packet 406. In a preferred embodiment, FP response packet 404 and FP data packet 406 are transmitted on a fixed schedule, with buffer chip 210 issuing FP data packet 406 a fixed number of cycles (e.g., T1) after FP response packet 404. In the illustrated example, FP response packet 404 includes an MC tag identifying which of agents 304a-304n issued the corresponding read request 400 and a beat number indicating which of the beat(s) of data will be returned by the associated FP data packet 406. The issuance of a FP response packet 404 by buffer chip 210 is described below with reference to block 1108 of FIG. 11. In the depicted example, FP data packet 406 includes a matching MC tag, the requested data granule, a DERR indication, a CERR indication, and the beat number. The issuance of a FP data packet 406 by buffer chip 210 is described below with reference to block 1116 of FIG. 11.

Figure 4C:
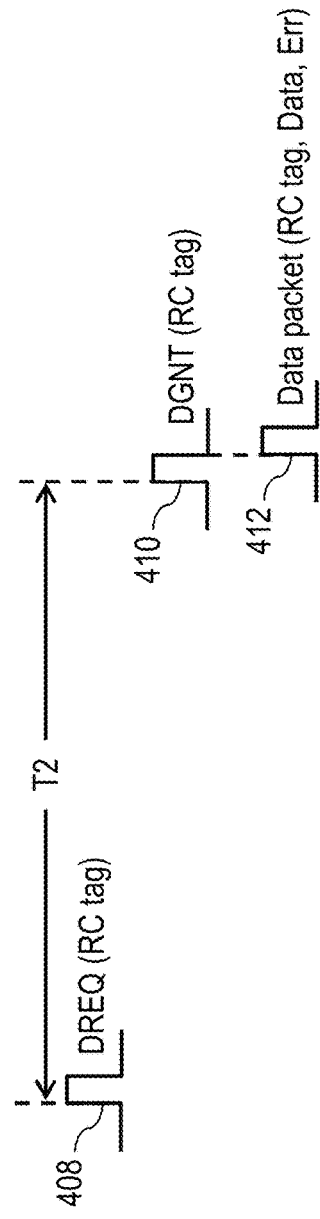
FIG. 4C is a timing diagram depicting the timing of a data request (DREQ), data grant (DGNT), and a data packet on a first interface of a memory controller in accordance with one embodiment.

Referring now to FIG. 4C, there is illustrated a timing diagram depicting the timing of a data request (DREQ), data grant (DGNT), and data packet on the first interface 300 of memory controller 106 in accordance with one embodiment. In this example, when memory controller 106 is to return a data granule accessed from system memory 108 in response to a read request of an RC machine 231, memory controller 106 first issues a DREQ 408 on the system interconnect fabric to request bandwidth to transmit the data granule. DREQ 408 includes an RC tag uniquely identifying the RC machine 231 that issued the read request that initiated access to the data granule in system memory 108. Arbitration logic within fabric controller 216 receives DREQ 408 and responds at a subsequent time with a DGNT 410 specifying the matching RC tag. Again, the use of tagging permits multiple DREQs and DGNTs to temporally overlap on the system interconnect fabric. In at least some embodiments, the timing of DGNT 410 with respect to the corresponding DREQ 408 can vary, but can be no less than an interval of T2 cycles. In response to DGNT 410, memory controller 106 issues a data packet 412 on the system interconnect fabric in fixed timing relation to DGNT 410 (e.g., hereinafter assumed to be the next cycle on the system interconnect fabric). In at least some embodiments, data packet 412 includes at least the RC tag of the RC machine 231 that requested the data granule, the data granule itself, and an error indication (Err).

Figure 5:
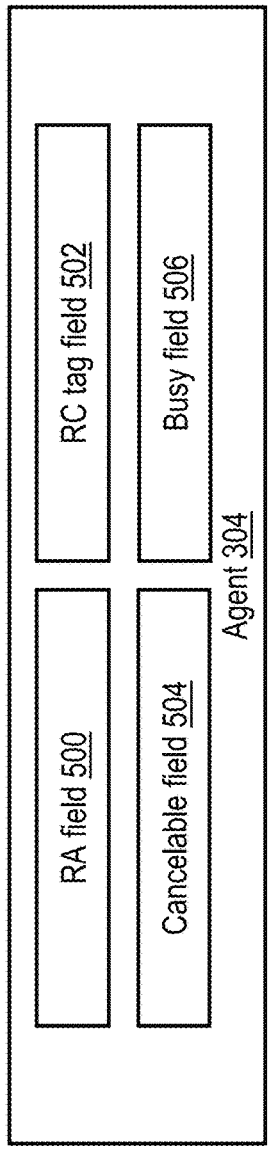
FIG. 5 is a more detailed block diagram of an agent within a memory controller in accordance with one embodiment.

With reference now to FIG. 5, there is illustrated a more detailed block diagram of an agent 304 within a memory controller 106 in accordance with one embodiment. In the illustrated example each of agents 304a-304n includes, in addition to logic the operation of which is described further herein, a number of fields for buffering information regarding a read request being handled by the agent 304. These fields include a read address (RA) field 500 for buffering the target real address of the read request, an RC tag field 502 for buffering the RC tag uniquely identifying the RC machine 231 that issued the read request, a cancelable field 504 reflecting whether or not the read request indicated it is cancelable, and a busy field 506 indicating whether or not agent 304 is busy handling a read request.

Figure 6:
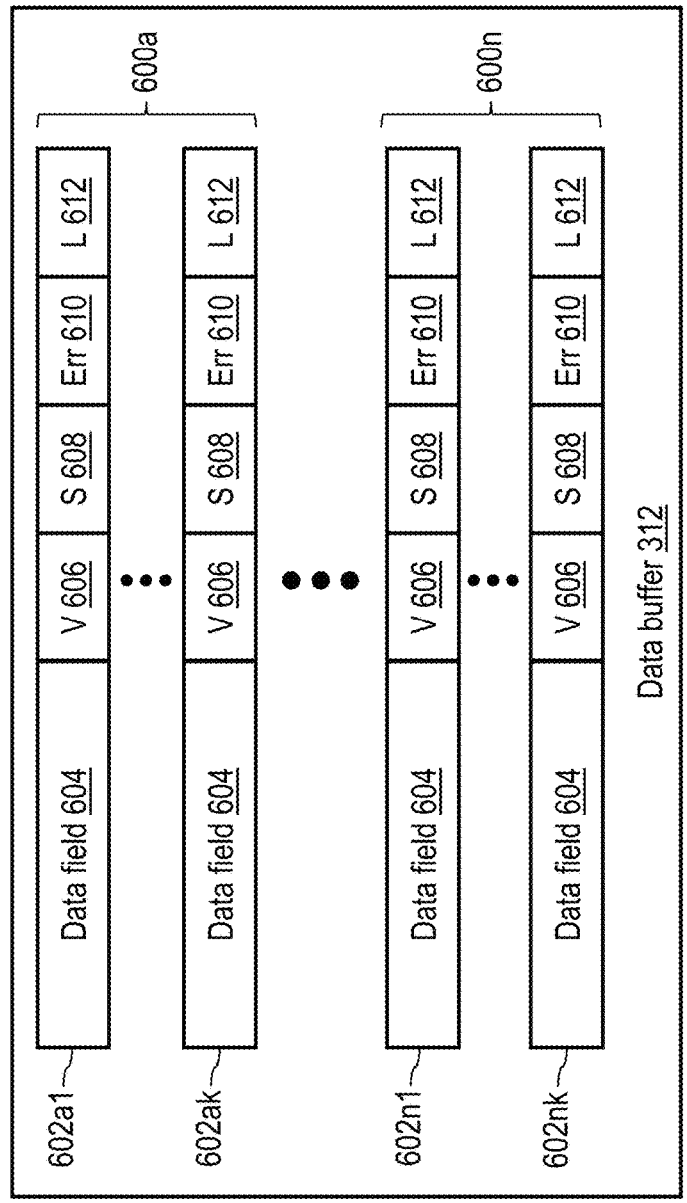
FIG. 6 is a more detailed block diagram of a data buffer within a memory controller in accordance with one embodiment.

Referring now to FIG. 6, there is depicted is a more detailed block diagram of data buffer 312 within a memory controller 106 in accordance with one embodiment. In this embodiment, data buffer 312 includes a plurality of buffer areas 600a-600n, each of which is associated with one of agents 304a-304n. Each buffer area 600 includes a plurality of buffers 602 for buffering a plurality of data granules associated with a read request of the associated agent 304. For example, buffer area 600a associated with agent 304a includes buffers 602a1-602ak, and buffer area 600n associated with agent 304n includes buffers 602n1-602nk. In this example, each buffer 602 is associated with a respective beat number and includes a data field 604 for buffering a particular one of the data granule(s) returned in response to a read request, a valid field 606 indicating whether or not the data granule is valid, a sent (S) field 608 indicating whether or not the data granule has been transmitted by memory controller 106 to the requesting RC machine 231 on the system interconnect fabric, an error (Err) field 610 indicating whether or not the data granule contains an error, and a lock (L) field 612 indicating whether or not memory controller 106 is currently busy handling this data granule. Those skilled in the art will appreciate that the storage location of the metadata represented by the settings of fields 606-612 is a design choice and that in other embodiments, this metadata may be maintained elsewhere, including within agents 304.

Figure 7:
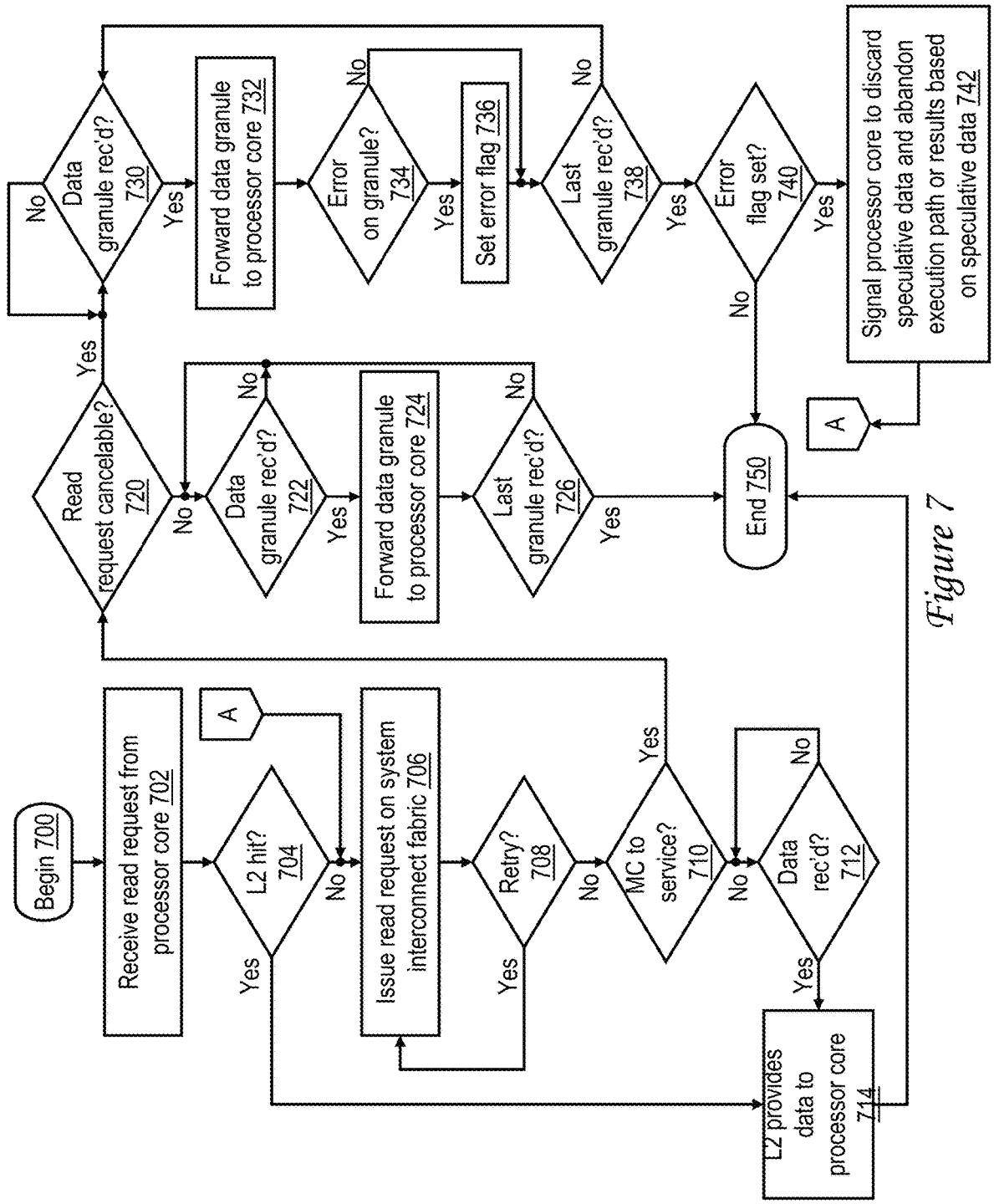
FIG. 7 is a high-level logical flowchart of a process by which a processing unit handles a read request of one of its processor cores in accordance with one embodiment.

With reference now to FIG. 7, there is depicted a high-level logical flowchart of an exemplary process by which a processing unit 104 handles a read request of a processor core 200 in accordance with one embodiment. The process of FIG. 7 begins at block 700 and then proceeds to block 702, which illustrates an L2 cache 230 of a processing unit 104 receiving a read request from the associated processor core 200. The read request can be generated, for example, by the execution of a corresponding load instruction by LSU 202. The read request can include, for example, (1) an indication of the request type (e.g., read), (2) a real address identifying the data to be read from the shared memory system and provided to processor core 200, and (3) an indication of whether or not the read request is cancelable (i.e., the return of speculative data is permitted). In some embodiments, the indication of whether the read request is cancelable can form a portion of the indication of the request type. In response to receipt of the read request, the L2 cache 230 determines whether or not the real address specified by the read request hits in the directory of L2 cache 230 (block 704). If so, L2 cache 230 returns data associated with real address from its internal data array to the processor core 200 (block 714), and the process of FIG. 7 ends at block 750.

Returning to block 704, in response to L2 cache 230 determining that the real address of the read request missed in its directory, L2 cache 230 allocates a RC machine 231 to handle the read request. The RC machine 231, in turn, issues a read request on the system interconnect fabric (block 706). The read request presented on the system interconnect fabric can include, for example, (1) an indication of the request type (e.g., read), (2) a real address identifying the data to be read, (3) an indication of whether or not the read request is cancelable, and (4) an RC tag uniquely identifying the issuing RC machine 231. The RC machine 231 then awaits receipt of a systemwide coherence response to the read request, referred to herein as a "combined response." As indicated at block 708, if the combined response is a Retry combined response, RC machine 231 will reissue the read request on the system interconnect fabric until a different combined response is received.

In response to receipt of a combined response other than Retry, the process of FIG. 7 proceeds from block 708 to block 710, which illustrates RC machine 231 determining whether or not the combined response of the read request indicates that the read request will be serviced by a memory controller 106 of one of system memories 108. If not (e.g., if the read request will be satisfied by an L2 cache 230 or L3 cache 232), RC machine 231 awaits receipt of the requested data (block 712). In response to receipt of the requested data, RC machine 231 generally caches the requested data in the cache array of L2 cache 230, and as shown at block 714, also supplies the requested data to the associated processor core 200. Following block 714, the RC machine 231 allocated to handle the read request is deallocated, and the process of FIG. 7 ends at block 750.

Referring again to block 710, in response to the RC machine 231 determining that the combined response of the read request indicated that the read request is to be serviced by one of memory controllers 106, RC machine 231 then awaits return of the requested data from the memory controller 106 responsible for the real address specified in the read request. It should be appreciated that in at least some embodiments, a memory controller 106, in response to receipt of the read request, may return multiple data granules in multiple distinct beats on the system interconnect fabric. For example, in an exemplary embodiment in which L2 caches 230 employ 128-byte cache lines, the memory controller 106 may, in response to the read request, return 128 bytes of data in four 32-byte data granules transmitted in four different beats on the system interconnect fabric. Although not required, it will hereafter be assumed that each read request serviced by a memory controller 106 will result in the memory controller 106 returning multiple data granules in multiple beats on the system interconnect fabric.

RC machine 231 handles the data returned by the memory controller 106 in accordance with whether or not the read request was cancelable (block 720). If the read request was not cancelable, RC machine 231 waits for a next data granule responsive to the read request to be received on the system interconnect fabric (block 722). When received, RC machine 231 generally caches the next data granule in the cache array of L2 cache 230 and additionally forwards the next data granule to the associated processor core 200 (block 724). The process illustrated at blocks 722-724 continues until all data granules responsive to the read request have been received and forwarded to the processor core 200 (block 726). Once all data granules responsive to the read request have been received and forwarded to the processor core 200, the process of FIG. 7 ends at block 750.

Referring again to block 720, if the read request was cancelable, RC machine 231 waits for a next data granule responsive to the read request to be received on the system interconnect fabric (block 730). When received, RC machine 231 generally caches the next data granule in the cache array of L2 cache 230 and additionally forwards the next data granule to the associated processor core 200 (block 732). As indicated at blocks 734-736, RC machine 231 determines whether an error is indicated for a data granule (e.g., in the beat communicating the data granule or in a subsequent beat) and, if so, sets an internal error flag indicating that the speculative data returned by the memory controller 106 contains a data error. As illustrated by block 738, the processing of data granules received in beats on the system interconnect fabric as shown at blocks 730-736 continues until all data granules responsive to the read request have been received and processed (block 738).

Once all data granules responsive to the read request have been received and processed, RC machine 231 determines whether or not its internal error flag has been set (block 740). If not, the RC machine 231 allocated to handle the read request is deallocated, and the process of FIG. 7 ends at block 750. If, however, RC machine 231 determines at block 740 that the error flag is set, L2 cache 230 signals the associated processor core 200 to discard the speculative data returned in response to the read request and to abandon any execution path and/or execution results determined based on the speculative data (block 742). The process of FIG. 7 then passes to block through page connector A to block 706 and following blocks, which have been described. In some embodiments, L2 cache 230 handles all cancelable read requests that failed as non-cancelable when re-issued.

Figure 8:
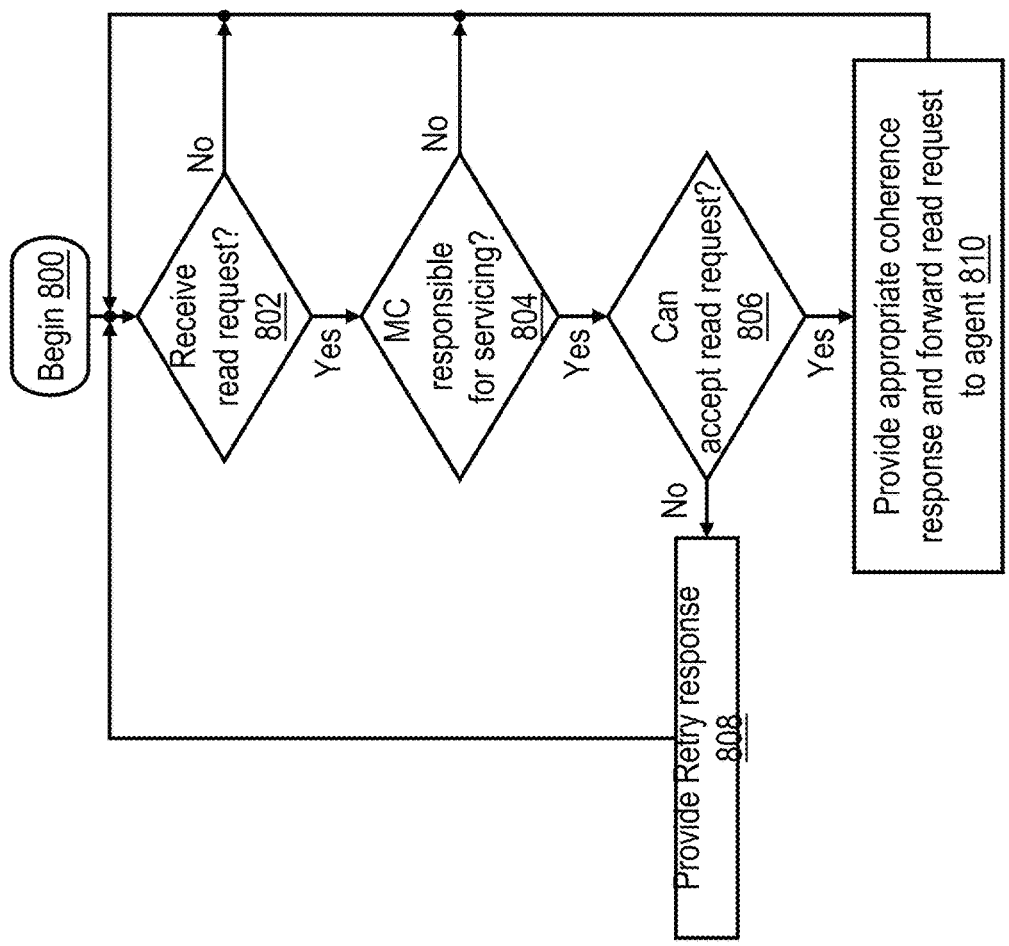
FIG. 8 is a high-level logical flowchart of an exemplary process by which a memory controller handles an incoming read request received from the system interconnect fabric in accordance with one embodiment.

With reference now to FIG. 8, there is illustrated a high-level logical flowchart of an exemplary process by which a memory controller 106 handles a read request in accordance with one embodiment. In some embodiments, the process of FIG. 8 can be implemented by scheduler 302 of FIG. 3.

The process of FIG. 8 begins at block 800 and then proceeds to block 802, which illustrates memory controller 106 iterating while awaiting receipt of a read request on the system interconnect fabric. In response to receipt of a read request (e.g., issued by an RC machine 231 of an L2 cache 230 at block 706 of FIG. 7), memory controller 106 determines at block 804 whether or not the memory controller 106 is responsible for servicing the read request. The determination illustrated at block 804 can include, for example, a determination whether or not the memory controller 106 is responsible for the real address specified by the read request.

In response to a negative determination at block 804, the process of FIG. 8 returns to block 802. If, however, memory controller 106 determines at block 804 that it is responsible for servicing the read request, memory controller 106 additionally determines at block 806 whether it can accept the read request. The determination depicted at block 806 can include, for example, memory controller 106 determining whether or not at least one agent 304 is available to handle the read request, as indicated by its busy field 506 being reset. If not, memory controller 106 provides a Retry coherence response to the read request (block 808). Thereafter, the process of FIG. 8 returns to block 802.

Referring again to block 806, in response to a determination that memory controller 106 can accept the read request, memory controller 106 provides an appropriate coherence response for the read request (block 810). At block 810, memory controller 106 also allocates an available agent 304 (e.g., one having its busy field 506 reset to indicate an idle state) to handle the read request and forwards the read request to the allocated agent 304. Thereafter, the process of FIG. 8 returns to block 802.

Figure 9:
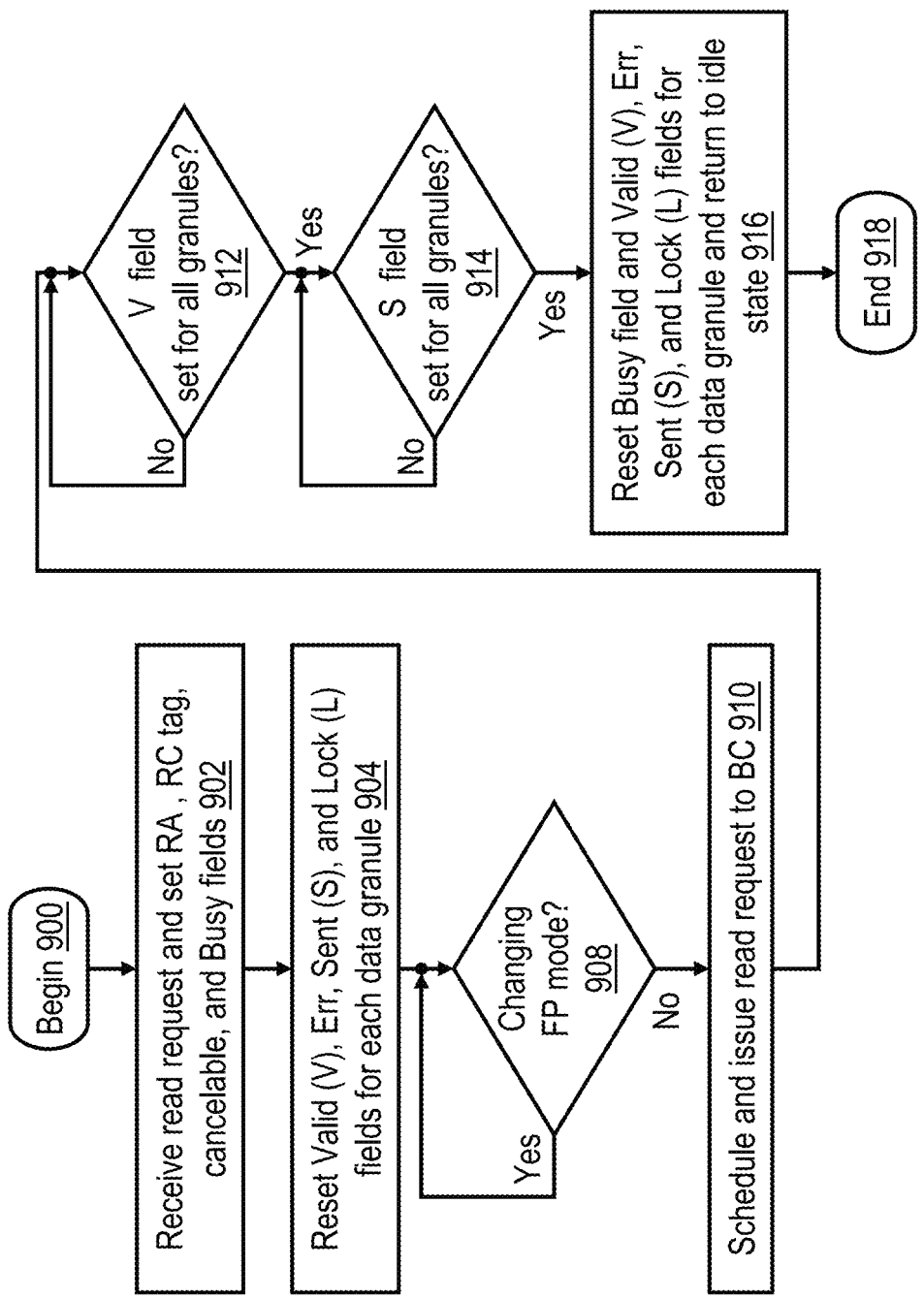
FIG. 9 is a high-level logical flowchart of an exemplary process by which an agent in a memory controller services a read request in accordance with one embodiment.

With reference now to FIG. 9, there is illustrated a high-level logical flowchart of an exemplary process by which an agent 304 in a memory controller 106 services a read request in accordance with one embodiment. The process begins at block 900 and then proceeds to block 902, which illustrates agent 304 receiving the read request forwarded at block 810 of FIG. 8, setting the busy field 506 of agent 304 to indicate its allocation to service the memory access request, and, based on the content of the read request, setting RA field 500, RC tag field 502, and cancelable field 504. In addition, agent 304 resets the valid field 606, sent field 608, error field 610, and lock field 612 of each buffer 602 in the buffer area 600 of the allocated agent 304.

Figure 16:
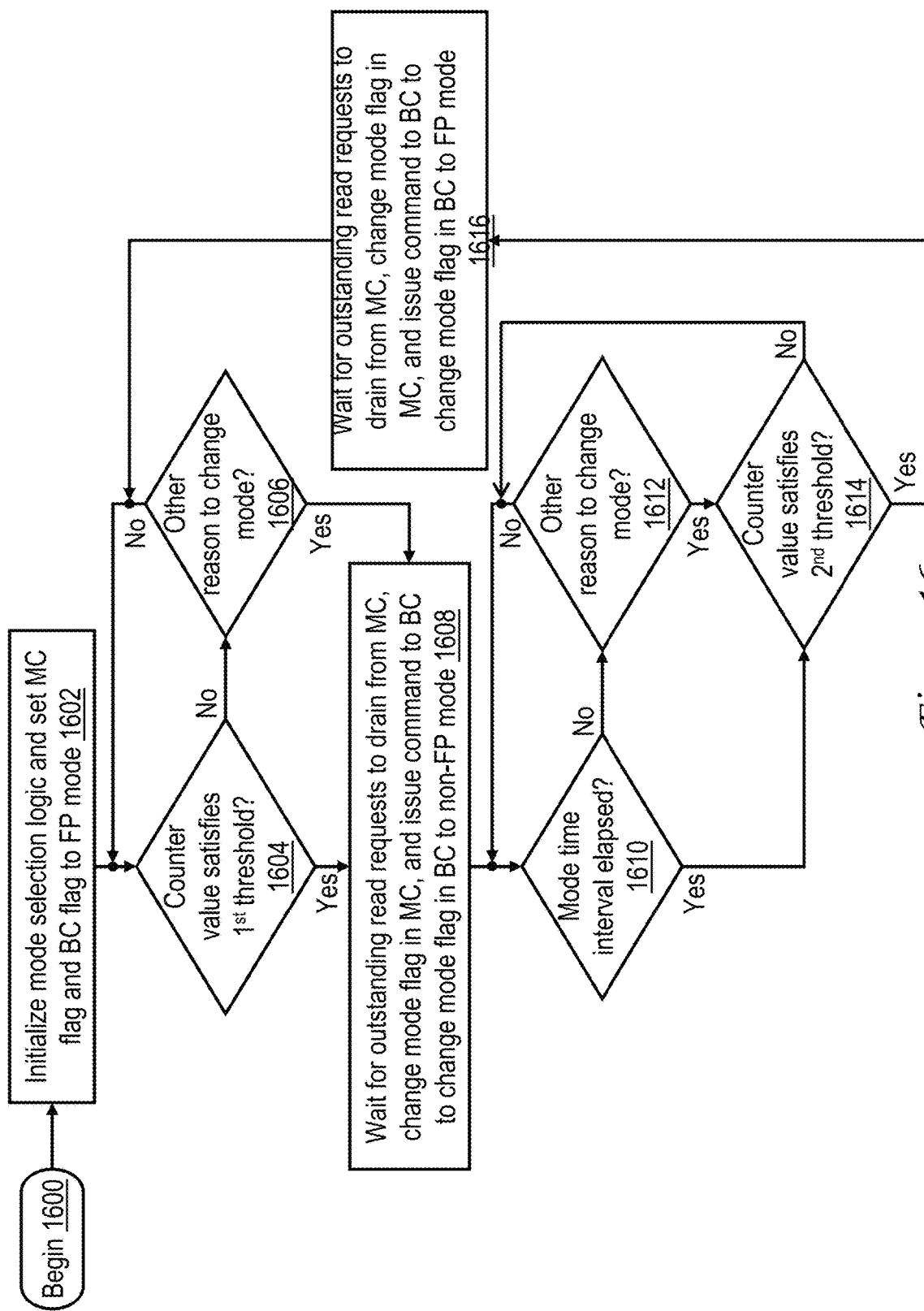
FIG. 16 is a high-level logical flowchart of an exemplary method by which mode selection logic within a memory controller updates an operating mode of the memory controller and an associated buffer chip in accordance with one embodiment.

At block 908, agent 304 determines whether or not memory controller 106 is changing between the FP and non-FP modes of operation, as depicted at blocks 1608 and 1616 of FIG. 16. If not, the process proceeds directly to block 910. If, however, agent 304 determines memory controller 106 is changing modes between the FP and non-FP modes of operation, agent 304 iterates at block 908 until the mode change is complete and then proceeds to block 910.

Block 910 depicts agent 304 scheduling and issuing to buffer chip 210 a read request corresponding to the read request received by memory controller 106. As indicated in FIGS. 4A-4B, the read request includes an MC tag identifying the agent 304 issuing the read request, the real address to be accessed, and an indication of whether or not the read request is cancelable. The agent 304 handles data granules returned by the buffer chip in response to the read request, as discussed further below with reference to FIGS. 12A-12C and 13. The agent 304 remains busy handling the data granules until the valid fields 606 and the sent fields 608 of all buffers 602 in the buffer area 600 of the agent 304 are set (block 912 and 914). Thereafter, handling of the read request by agent 304 is complete, and agent 304 accordingly resets the valid field 606, sent field 608, error field 610, and lock field 612 of each buffer 602 in the buffer area 600 of that agent 304 and returns to an idle state (block 916). Thereafter, the process of FIG. 9 ends at block 918.

Figure 10:
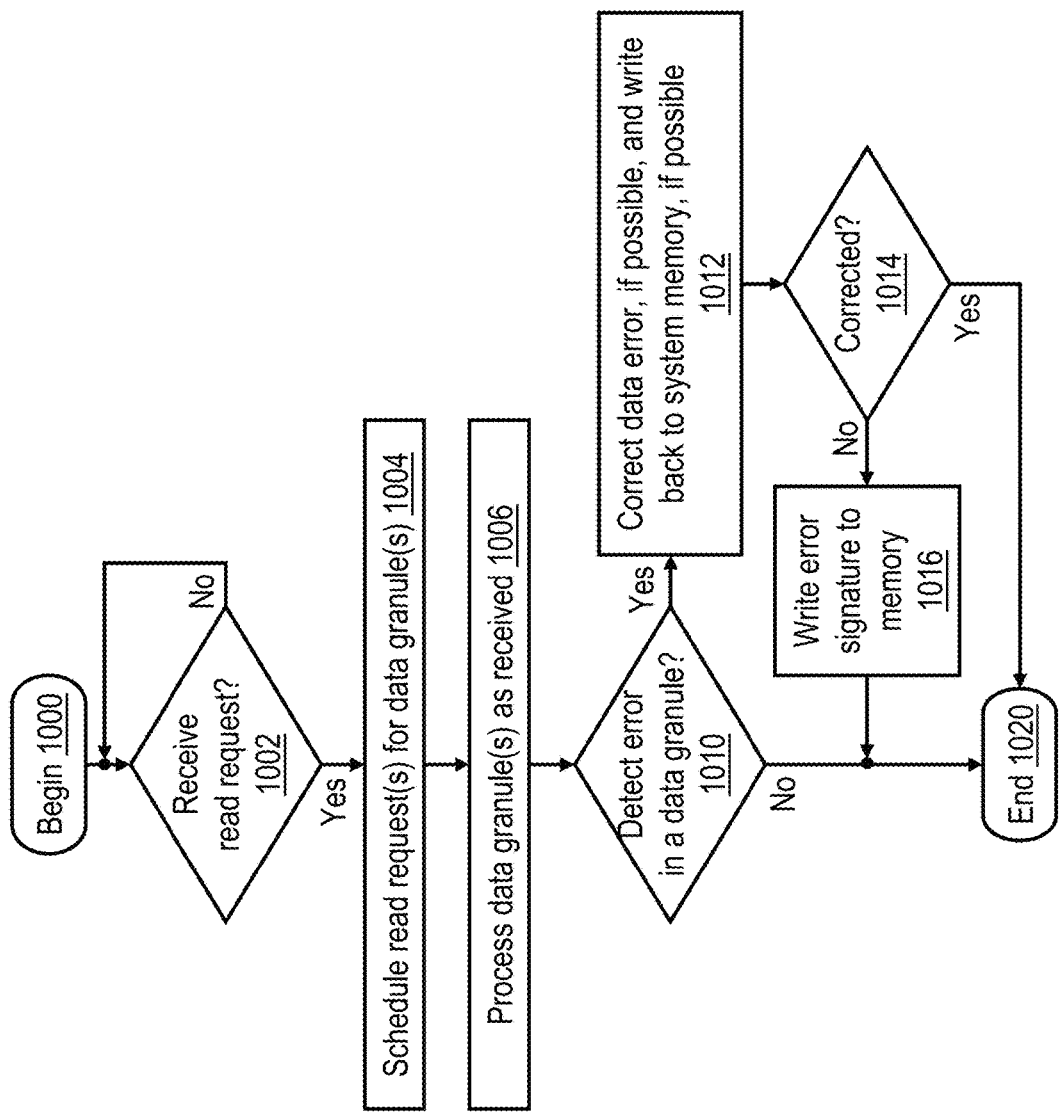
FIG. 10 is a high-level logical flowchart of an exemplary process by which a buffer chip handles a read request received from a memory controller in accordance with one embodiment.

Referring now to FIG. 10, there is depicted a high-level logical flowchart of an exemplary process by which a buffer chip 210 handles a read request received from a memory controller 106 in accordance with one embodiment. The process of FIG. 10 begins at block 1000 and thereafter proceeds to block 1002, which illustrates buffer chip 210 monitoring for receipt of a read request from the associated memory controller 106, for example, as issued at block 910 of FIG. 9. In response to receipt of a read request from the associated memory controller 106, scheduler 322 of buffer chip 210 schedules one or more read requests for the data granule(s) associated with the real address specified in the read request received from memory controller 106 and issues the read requests to system memory 108 via memory interface 324 (block 1004). It will be appreciated that read requests for multiple individual data granules are frequently performed in an order other than sequential real address order, for example, based on the assignment of addresses to storage locations in system memory 108, the location of open memory pages, other pending read requests, memory refresh schedules, etc. Buffer chip 210 processes data granule(s) received from system memory 108 based on the read requests as described in greater detail below with reference to FIG. 11 (block 1006).

As indicated at block 1010, error handling logic 326 detects whether or not any of the data granules accessed from system memory 108 contains a data error, for example, based on data parity. If not, the process of FIG. 10 ends at block 1020. If a data error is detected at block 1010 in at least one of the data granules returned from system memory 108, error handling logic 326 of buffer chip 210 corrects the data error, if possible, and writes the corrected data back into system memory 108, if possible (block 1012). Error handling logic 326 determines at block 1014 whether or not all detected data errors were able to be corrected. If error handling logic 326 determines at block 1014 that it is unable to correct the error in a data granule, error handling logic 326 overwrites the uncorrectable data granule with an error signature signifying corrupted data (block 1016). Following block 1016 or an affirmative determination at block 1014, the process of FIG. 10 ends at block 1020.

Figure 11:
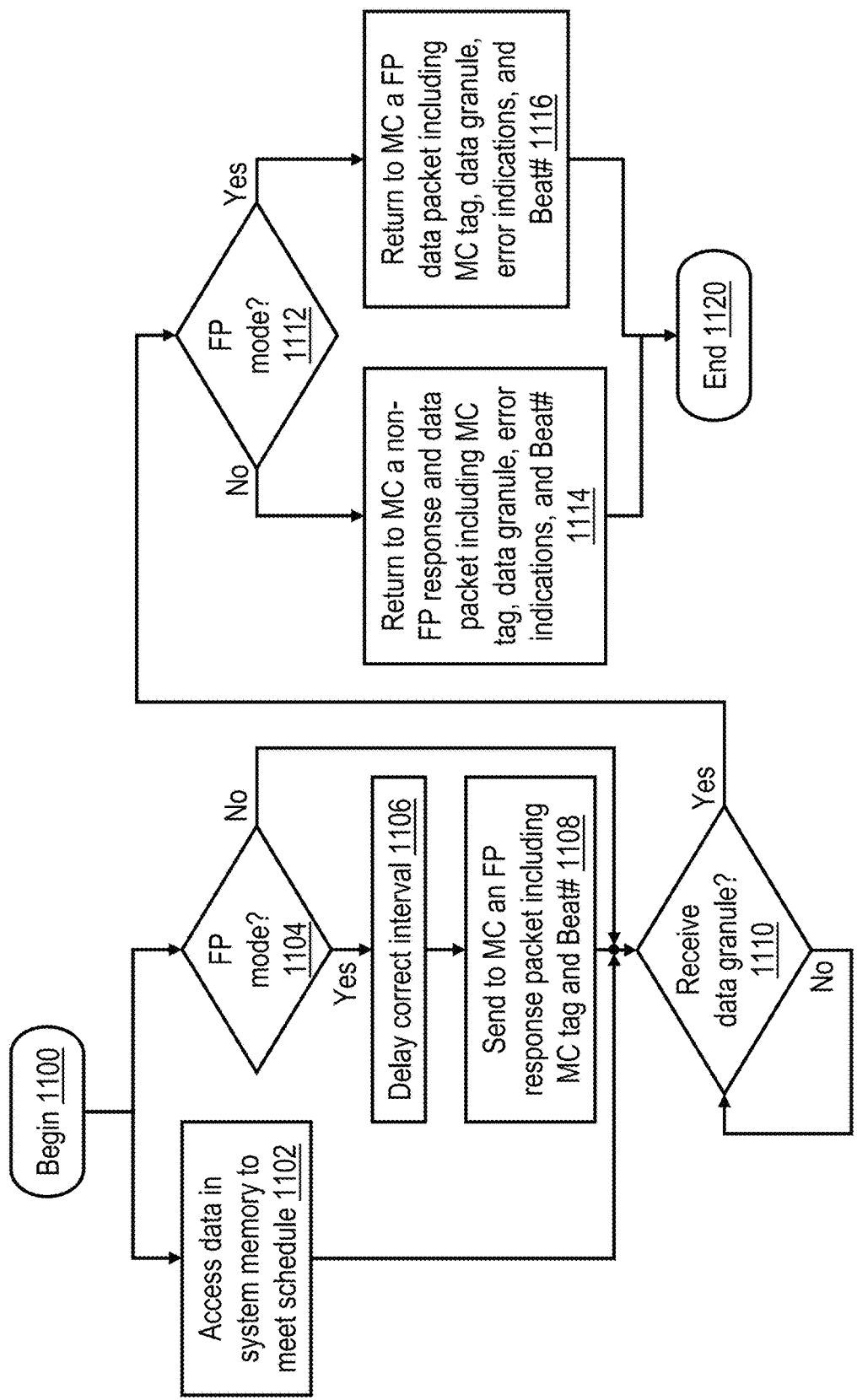
FIG. 11 is a high-level logical flowchart of an exemplary process by which a buffer chip accesses a data granule from system memory and returns the data granule to a memory controller in accordance with one embodiment.

With reference now to FIG. 11, there is illustrated a high-level logical flowchart of an exemplary process by which a buffer chip 210 accesses a data granule from system memory 108 and returns the data granule to a memory controller 106 in accordance with one embodiment. Because the process of FIG. 11 illustrates the handling of one data granule, it should be understood that the illustrated process is performed multiple times per read request if read requests return multiple granules and these instances of the process can be performed in a pipelined and overlapping manner.

The process of FIG. 11 begins at block 1100 and then proceeds in parallel to blocks 1102 and 1104. At block 1102, buffer chip 210 accesses system memory 108 to obtain a given data granule in accordance with a desired schedule. As shown at block 1104, buffer chip 1104 additionally determines by reference to mode flag 338 whether it is currently configured to operate in FP mode. If not, the process proceeds to a join point and then proceeds to block 1110, which is described below. If, however, buffer chip 1104 determines at block 1104 that it is currently configured to operate in the FP mode, buffer chip 210 delays a correct interval to allow the FP data packet to be delivered to memory controller 106 at a fixed relative timing of T1 cycles as shown in FIG. 4B (block 1106) and then issues a FP response packet to memory controller 106 (block 1108). As noted above, in this example, the FP response packet includes the MC tag identifying the agent 304 that issued the read request to buffer chip 210 and an indication of the beat number of the data granule that will be returned in the corresponding FP data packet. Thereafter, the process of FIG. 11 proceeds to a join point and then proceeds to block 1110.

Block 1110 illustrates buffer chip 210 awaiting receipt of the data granule requested at block 1102. In response to receipt of the data granule, buffer chip 210 handles the data granule in accordance with its current operating mode as indicated by mode flag 338 (block 1112). If buffer chip 210 is in non-FP mode, buffer chip 210 returns to memory controller 106 a non-FP response and data packet (block 1114). As noted, the non-FP response and data packet can include, for example, an MC tag identifying the agent 304 that issued the read request, the data granule read from system memory 108, error indications indicating whether or not the data granule contains a DERR or CERR, and a beat number identifying which of the data granules responsive to the read request is being returned. If, on the other hand, buffer chip 210 is in FP mode, buffer chip 210 returns to memory controller 106 a FP data packet (block 1116). As noted, the FP data packet can include, for example, an MC tag identifying the agent 304 that issued the read request, the data granule read from system memory 108, error indications indicating whether or not the data granule contains a DERR or CERR, and a beat number identifying which of the data granules responsive to the read request is being returned. Following either of blocks 1114 and 1116, the process of FIG. 11 ends at block 1120.

Figure 12A:
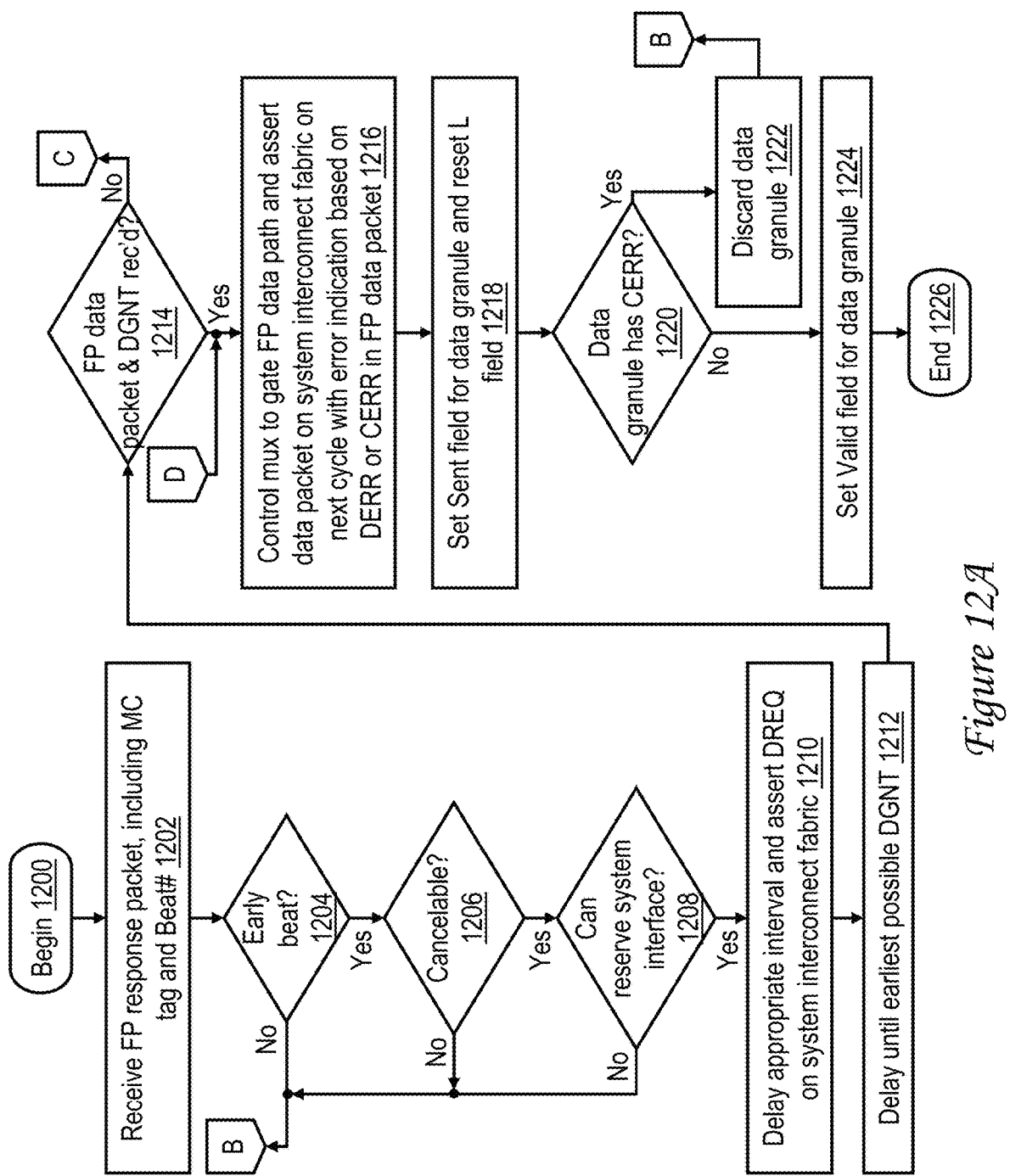
Figure 12B:
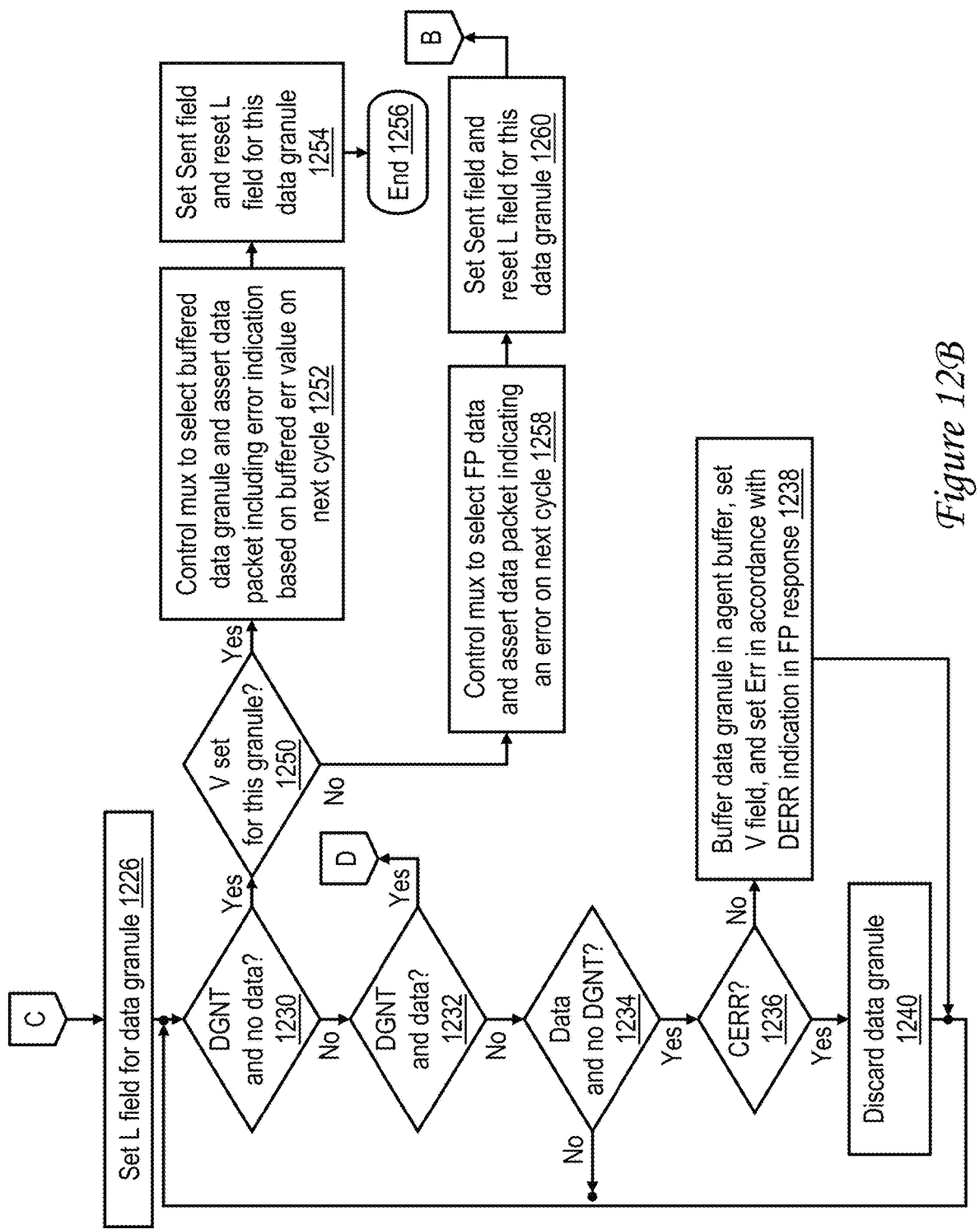

Referring now to FIGS. 12A-12C, there is illustrated a high-level logical flowchart of an exemplary process by which a memory controller 106 handles FP response packets and FP data packets issued by a buffer chip 210 while operating in a FP mode in accordance with one embodiment. The process of FIG. 12A begins at block 1200 and then proceeds to block 1202, which illustrates memory controller 106 receiving a FP response packet issued by buffer chip 210 at block 1108 of FIG. 11. At blocks 1204-1208, memory controller 106 determines whether or not it will attempt to assert the data granule associated with the FP response packet on the system interconnect fabric via fast path 316. For example, memory controller 106 may determine not to utilize fast path 316 if the associated data granule is not in an early beat (e.g., one of the first two data granules to be returned) (block 1204), if the associated read request was not cancelable (block 1206), or if memory controller 106 cannot reserve use of first interface 300 to issue a DREQ (block 1208). If memory controller 106 determines not to assert the data granule associated with the FP response packet on the system interconnect fabric via fast path 316, the process passes from any of blocks 1204-1208 through page connector B to block 1270 of FIG. 12C, which is described below. If, however, memory controller 106 determines to assert the data granule associated with the FP response packet on the system interconnect fabric via fast path 316, the process of FIG. 12A proceeds to block 1210.

Block 1210 illustrates memory controller 106 delaying the appropriate time interval to properly align timing of access to the system interconnect fabric with expected arrival of the data granule from buffer chip 210 T1 cycles after receipt of the FP response packet at block 1202. After delaying the appropriate time interval, memory controller 106 additionally requests permission to transmit a data granule on the system interconnect fabric by asserting a DREQ 408 on the system interconnect fabric. As indicated at block 1212, memory controller 106 then delays for the minimum time interval T2 following issuance of the DREQ before checking for the arrival on the system interconnect fabric of a DGNT corresponding to the DREQ issued at block 1210.

The process proceeds from block 1212 to block 1214, which illustrates memory controller 106 determining whether or not a FP data packet has been received from buffer chip 210 via the second interface 306 and a DGNT has been received from the system interconnect fabric 300 via first interface 300. If the FP data packet and the DGNT have not both been received, the process proceeds through page connector C to FIG. 12B, which is described below. If, however, memory controller 106 determines at block 1214 that both the DGNT and FP data packet have been received, control logic 318 controls multiplexer 314 to select the data granule present on fast path 316 and to assert a data packet 412 on the system interconnect fabric on the cycle following the DGNT (block 1216). As indicated, the data packet includes the RC tag of identifying the RC machine 231 that issued the initial read request, the data granule received from buffer chip 210 in the FP data packet, and an error indication that indicates if either DERR or CERR is set in the FP data packet. In the buffer 602 corresponding to the data granule, memory controller 106 additionally sets the sent field 608 to indicate that the data granule has been transmitted on the system interconnect fabric and resets lock field 612 (block 1218). Lock field 612 is reset at block 1218 to handle the case that block 1218 is reached via the path returning from FIG. 12B to FIG. 12A via page connector D, as lock field 612 is set upon entering FIG. 12B.

At block 1220, memory controller 106 additionally determines whether or not the ERR indication was set in the FP data packet to indicate a CERR in the data granule. If so, the link logic responsible for maintaining the physical link between buffer chip 210 and memory controller 106 will heal the link in a conventional manner and will replay the FP data packet. Accordingly, memory controller 106 discards the data granule containing the CERR (which has already been transmitted in a data packet on the system interconnect fabric) and awaits the replayed FP data packet to complete the link protocol (block 1222). The process of FIG. 12A proceeds from block 1222 through page connector B to FIG. 12C, which is described below. Referring again to block 1220, if memory controller 106 determines that the data granule returned in the FP data packet did not contain a CERR, memory controller 106 sets the valid field 606 in the data buffer 602 associated with the data granule. Thereafter, the process of FIG. 12A ends at block 1226.

Referring now to FIG. 12B, the illustrated process handles the various cases in which at least one the DGNT and FP data packet did not show up in time to enable a data packet to be asserted on the system interconnect fabric in the desired cycle. The process of FIG. 12B begins at page connector C and then proceeds to block 1226, which illustrates memory controller 106 setting lock field 612 in the buffer 602 associated with the beat number of the data granule in question to record that memory controller 106 is currently busy handling the receipt and/or transmission of the data granule. The process of FIG. 12B then enters a processing loop including blocks 1230-1240 in which memory controller 106 determines over one or more cycles how to handle the failure to receive both the DGNT and FP data packet in the desired cycle at block 1214. At block 1230, memory controller 106 determines whether, in a current processing cycle, DGNT is received, but the FP data packet is not received (e.g., because the FP data packet was either previously received or has yet to be received). If not, the process proceeds to block 1232, which is described below. If, however, memory controller 106 makes an affirmative determination at block 1230, the process of FIG. 12B proceeds to block 1250.

Block 1250 illustrates memory controller 106 determining whether or not the valid field 606 of the buffer 602 associated with the data granule is set to indicate that the FP data packet has been previously received and the data granule is accordingly buffered in the associated data field 604. If so, control logic 318 of memory controller 106 controls multiplexer 314 to select the data granule from data field 604 and to assert on the system interconnect fabric in the next cycle a data packet 412 including the RC tag of the requesting RC machine 231, the data granule from data field 604, and an error indication set or reset based the value of the Err field 610 associated with the data granule (block 1252). Memory controller 106 additionally sets the sent field 608 of the buffer 602 associated with the data beat and resets lock field 612 to indicate that handling of the data beat is concluded (block 1254). Thereafter, the process of FIG. 12B ends at block 1256. Returning to block 1250, if memory controller 106 determines at block 1250 that valid field 606 of the buffer 602 associated with the data granule is not set, control logic 318 of memory controller 106 controls multiplexer 314 to select the data value present on fast path 316 and to assert on the system interconnect fabric in the next cycle a data packet 412 including the RC tag of the requesting RC machine 231, the data value present on fast path 314, and an error indication set to indicate that the data value is erroneous (block 1258). Following block 1258, memory controller 106 sets the sent field 608 of the buffer 602 associated with the data beat and resets lock field 612 to indicate that handling of the data beat is concluded (block 1260). Thereafter, the process of FIG. 12B proceeds through page connector B to FIG. 12C, which is described below.

Referring now to block 1232, memory controller 106 determines whether or not both the DGNT and FP data packet are received in the present cycle. Of course, an affirmative determination at block 1232 can only be made in a cycle subsequent to the cycle at which a negative determination is made at block 1214. In response to an affirmative determination at block 1232, the process returns through page connector D to block 1216 and following blocks of FIG. 12A, which have been described. In response to a negative determination at block 1232, memory controller 106 additionally determines at block 1234 whether or not the FP data packet is received, but no DGNT is received. If not, meaning that neither the FP data packet nor the DGNT is received, the process of FIG. 12B returns to block 1230, which has been described. If, however, memory controller 106 determines at block 1234 that the FP data packet has been received, but no DGNT has been received, the process proceeds to block 1236.

At block 1236, memory controller 106 determines whether or not the FP data packet indicates presence of a CERR in the data granule. If not, memory controller 106 buffers the data granule received in the FP data packet in the data field 604 of the appropriate buffer 602, sets the associated valid field 606, and sets Err field 610 in accordance with the DERR indication in the FP data packet (block 1238). If, however, memory controller determines that the FP data packet indicates presence of a CERR in the data granule, memory controller 106 discards the FP data packet and the data granule contained therein (block 1240). Following either block 1238 or block 1240, the process of FIG. 12B returns to block 1230 and following blocks, which have been described.

With reference now to FIG. 12C, the process begins at page connector B following a negative determination at one of blocks 1204-1208 or following block 1222 FIG. 12A. The process of FIG. 12C proceeds from page connector B to block 1270, which illustrates the process iterating until a data packet (e.g., a non-FP response and data packet or FP data packet) has been received from buffer chip 210 by memory controller 106. The process then proceeds to block 1272, which illustrates memory controller 106 determining whether or not the CERR indication in the FP data packet indicates a CERR in the data granule. If so, memory controller 106 discards the data granule containing the CERR and awaits the replayed FP data packet (blocks 1274 and 1270). If memory controller 106 determines at block 1272 that the data granule returned in the FP data packet did not contain a CERR, memory controller 106 additionally determines at block 1280 whether or not the DERR indication in the FP data packet indicates a DERR in the data granule. If so, memory controller 106 sets the Err field 610 of the appropriate buffer 602 (block 1282). Following block 1282 or if the DERR indication was not set in the FP data packet at block 1280, the process proceeds to block 1284. Block 1284 illustrates memory controller 106 determining by reference to the relevant sent field 608 whether or not the data granule has already been transmitted on the system interconnect fabric. If not, memory controller 106 installs the data granule received in the FP data packet into the data field 604 of the appropriate buffer 602 (block 1286) and sets the associated valid field 606 (block 1288). If, on the other hand, memory controller 106 determines at block 1284 that the data granule has already been transmitted on the system interconnect fabric, memory controller 106 refrains from installing the data granule into data buffer 312 and sets the relevant valid field 606 (block 1288). Following block 1288, the process of FIG. 12C ends at block 1290.

With reference now to FIG. 13, there is illustrated a high-level logical flowchart of an exemplary embodiment of a process by which a memory controller 106 handles a data granule returned by a buffer chip 210 in a non-FP response and data packet while operating in a non-FP mode. The process of FIG. 13 begins at block 1300 and then proceeds to block 1302, which illustrates memory controller 106 determining whether or not a non-FP response and data packet conveying a data beat responsive to a read request has been received from the associated buffer chip 210. If not, the process iterates at block 1302. If, however, memory controller 106 makes an affirmative determination at block 1302, the process proceeds through page connector E to block 1272 and following blocks of FIG. 12C, which have been described. Thus, in the illustrated embodiment, the handling of the non-FP response and data packet is the same as for the handling of the FP data packet in FIG. 12C.

Referring now to FIG. 14, there is a high-level logical flowchart of an exemplary process by which a memory controller 106 returns data from data buffer 312 to requesting RC machines 231 via the system interconnect fabric in accordance with one embodiment. The process of FIG. 14 begins at block 1400 and then proceeds to block 1402, which illustrates memory controller 106 examining data buffer 312 to determine if any buffer 602 associated with any agent 304 has contains a data granule ready to send to a RC machine 231, as indicated by the valid field 606 being set and sent field 608 and lock field 612 being reset. If not, the process of FIG. 14 iterates at block 1402.

In response to memory controller 106 determining at block 1402 that at least one buffer 602 contains a data granule ready to send to a RC machine 231, memory controller 106 selects one of the buffers 602 qualified at block 1402 (block 1404), reserves access to the system interconnect fabric via first interface 300 (block 1406), and issues a DREQ 408 on the system fabric interface to request permission to transmit a data packet (block 1408). Memory controller 106 then awaits receipt of a DGNT 410 (block 1410). In response to receipt of the DGNT 410, control logic 318 controls multiplexer 314 to select the data granule buffered in the data field 604 of the selected buffer 602 and, on the cycle following DGNT 410, asserts on the system interconnect fabric a data packet 412 that includes the RC tag from the RC tag field 502 of the associated agent 304, the data granule accessed from data buffer 312, and an Err indication set in accordance with the contents of the Err field 610 of the selected buffer 602 (block 1412). Memory controller 106 additionally sets sent field 608 of the selected buffer 602 to indicate the data granule buffered in the selected buffer 602 has been returned to the requesting RC machine 231 (block 1414). Thereafter, the process of FIG. 14 returns to block 1402.

Figure 15:
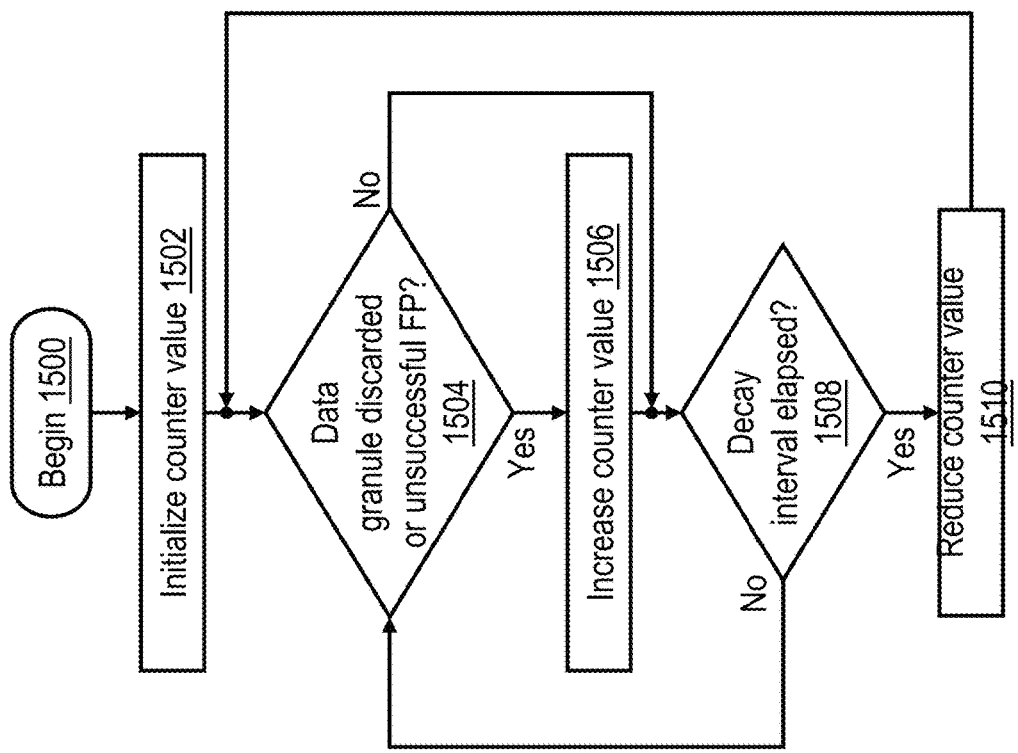
FIG. 15 is a high-level logical flowchart of an exemplary method by which mode selection logic within a memory controller updates a counter value in accordance with one embodiment.

With reference now to FIG. 15, there is illustrated a high-level logical flowchart of an exemplary method by which mode selection logic 330 within a memory controller 106 updates a counter value maintained by counter 332 in accordance with one embodiment. As described below with reference to FIG. 16, the counter value maintained in counter 332 can be utilized by memory controller 106 to determine whether memory controller 106 and buffer chip 210 operate in FP mode or non-FP mode.

The process of FIG. 15 begins at block 1500 and then proceeds to block 1502, which illustrates mode selection logic 330 initializing the counter value maintained within counter 332 to an initial counter value, such as 0. As indicated at blocks 1504-1506, each time that memory controller 106 discards a data granule (e.g., at any of blocks 1222, 1240, and 1274) or is unsuccessful in transmitting a data packet in FP mode at block 1214, mode selection logic 330 increases the counter value of counter 332 by a predetermined amount. At block 1508, mode selection logic 330 additionally determines whether or not a decay interval tracked by timer 334 has elapsed. If so, mode selection logic 330 reduces the counter value within counter 332, for example, by subtracting a predetermined value from the counter value or dividing the counter value by a predetermined value (block 1510). Following block 1510 or a negative determination at block 1508, the process of FIG. 15 returns to block 1504, which has been described.

Referring now to FIG. 16, there is illustrated a high-level logical flowchart of an exemplary method by mode selection logic 330 within a memory controller 106 updates an operating mode of the memory controller 106 and an associated buffer chip 210 in accordance with one embodiment.

The process of FIG. 16 begins at block 1600 and then proceeds to block 1602, which illustrates memory controller 106 initializing mode selection logic 330 and setting mode flag 336 of memory controller 106 and mode flag 338 of buffer chip 210 to indicate FP mode. At blocks 1604-1606, mode selection logic 330 determines whether or not the counter value maintained within counter 332 satisfies (e.g., is greater than or equal to) a first threshold or if there is another reason to change the current operating mode of memory controller 106 and buffer chip 210 from FP mode to non-FP mode. In response to negative determinations at blocks 1604-1606, the process of FIG. 16 continues to iterate at blocks 1604-1606. However, in response to an affirmative determination at either of blocks 1604-1606, mode selection logic 330 changes the operating mode at block 1608. During the process of changing the operating mode, an affirmative determination will be made at block 908 of FIG. 9. In order to change the operating mode, mode selection logic 330 waits for any in-flight read requests that have not been serviced to drain from memory controller 106, updates mode flag 336 to indicate non-FP mode, and issues a command to buffer chip 210 to update mode flag 338.

At block 1610, mode selection logic 330 determines whether or not timer 334 indicates that at least a mode time interval has elapsed since mode selection logic 330 changed the operating mode of memory controller 106 and buffer chip 210 to non-FP mode at block 1608. If not, the process passes to block 1612, which depicts mode selection logic 330 determining whether or not there is another reason to change the current operating mode of memory controller 106 and buffer chip 210 from non-FP mode to FP mode. If not, the process returns to block 1610. If mode selection logic 330 determines at block 1610 that the mode time interval has elapsed since the last mode change or if another reason to change operating modes is determined at block 1612, mode selection logic 330 additionally determines at block 1614 whether or not the counter value maintained within counter 332 satisfies (e.g., is less than or equal to) a second threshold, which may be the same or different from (e.g., less than) the first threshold. If not, the process returns to block 1610. If, however, mode selection logic 330 makes an affirmative determination at block 1614, the process proceeds to block 1616, which illustrates mode selection logic 330 changing the operating mode of memory controller 106 and buffer chip 210 from non-FP mode to FP mode. During the process of changing the operating mode, an affirmative determination will be made at block 908 of FIG. 9. In order to change the operating mode, mode selection logic 330 waits for any in-flight read requests that have not been serviced to drain from memory controller 106 and then updates mode flag 336 and issues a command to buffer chip 210 to update mode flag 338. Following block 1616, the process of FIG. 16 returns to block 1604, which has been described.

Figure 17:
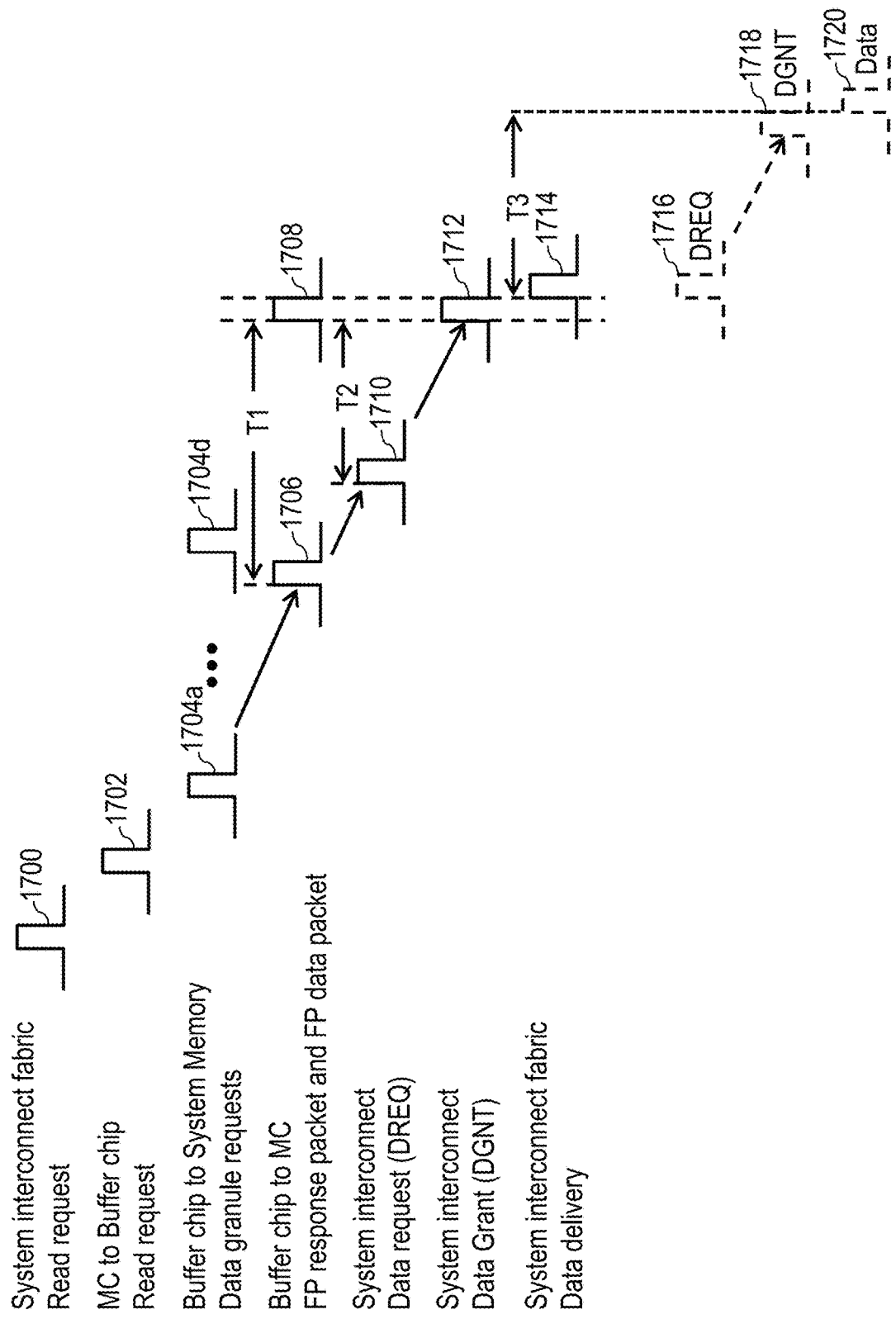
FIG. 17 is a timing diagram illustrating fastpath data delivery in accordance with one embodiment.

FIG. 17 is a timing diagram illustrating fastpath data delivery in accordance with one embodiment. In the illustrated operating scenario, a memory controller 106 receives a read request 1700 from an RC machine 231 and issues a corresponding read request 1702 to the associated buffer chip 210. Buffer chip 210, in turn, issues a sequence of data granule requests 1704a-1704d to the attached system memory 108. For purposes of this example, the first of these data granule requests, namely, data granule request 1704a, is assumed to be handled in FP mode.

Accordingly, buffer chip 210 responds to data granule request 1704a by initiating access to the requested data granule in system memory 108 and providing a fast path packet 1706 to notify memory controller 106 of the expected subsequent delivery of FP data packet 1708 T1 cycles later. In response to receipt of FP response packet 1706, memory controller 106 issues a DREQ 1710 on the system interconnect fabric to request permission to subsequently issue a data packet. A minimum of T2 cycles after DREQ 1710, memory controller 106 receives a DGNT 1712 in a same cycle as memory controller 106 receives the data granule from buffer chip 210 in FP data packet 1708. In response to receipt of DGNT 1712 and FP data packet 1708, memory controller 106 asserts a data packet 1714 containing the data granule received in FP data packet 1708 on the system interconnect fabric to respond to the read request 1700 of the requesting RC machine 231.

FIG. 17 further illustrates that, without overlapping the latency of DREQ 1710 with the access latency of reading a data granule from system memory in the described manner, the earliest memory controller 1710 would be able to issue a DREQ 1716 is the cycle following receipt of the data granule from buffer chip 210. If this were the case, a DGNT 1718 would be received no earlier than T2 cycles later, and the earliest memory controller 106 could transmit the data granule 1720 on the system interconnect fabric is the following cycle. As a result, the use of the FP mode described herein results in a reduction in the latency of read requests serviced from system memory of T3 cycles, where T3 is at least T2+1 cycles.

Figure 18:
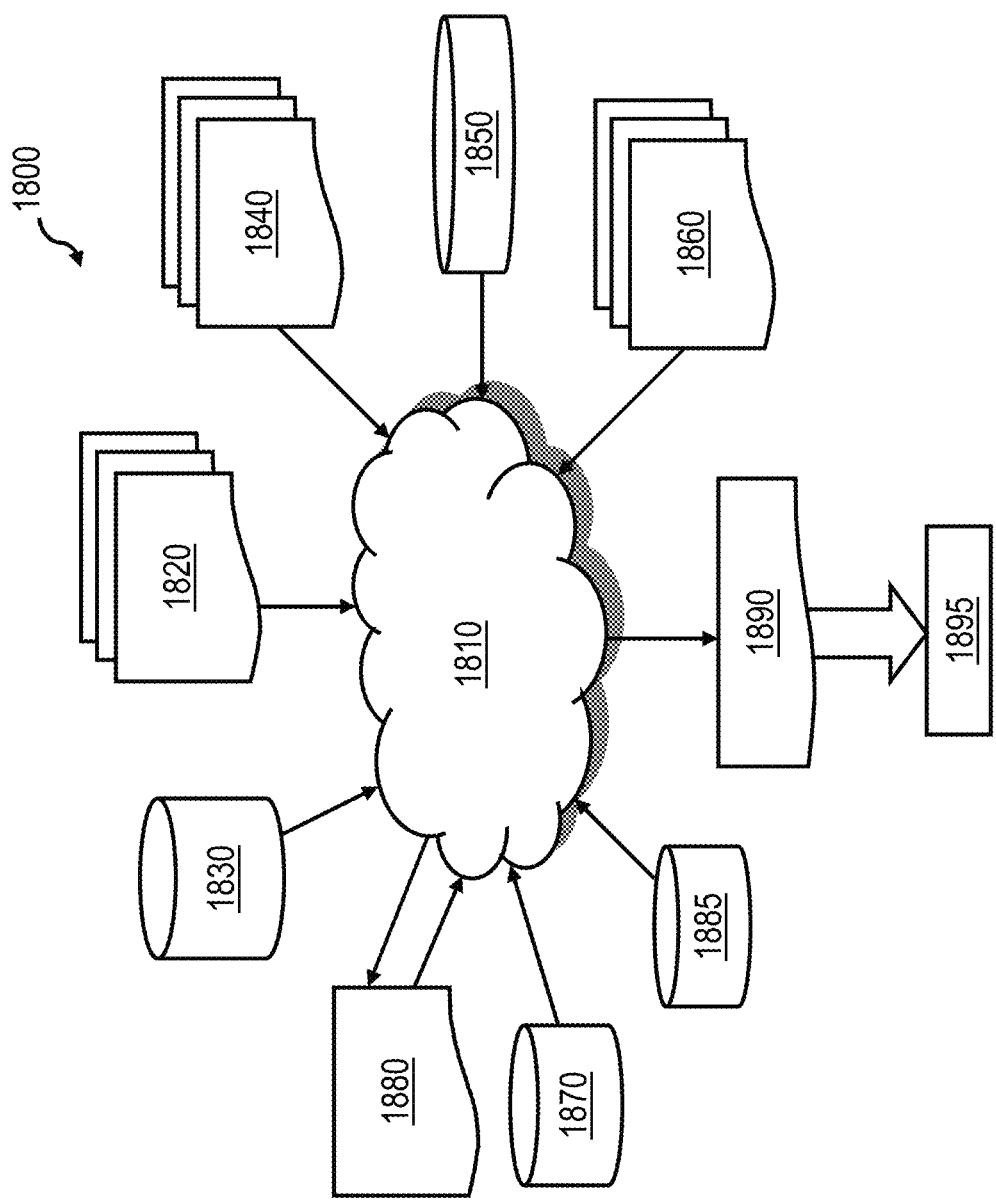
FIG. 18 is a data flow diagram illustrating a design process.

Referring now to FIG. 18, there is depicted a block diagram of an exemplary design flow 1800 used for example, in semiconductor IC logic design, simulation, test, layout, and manufacture. Design flow 1800 includes processes, machines and/or mechanisms for processing design structures or devices to generate logically or otherwise functionally equivalent representations of the design structures and/or devices described above and shown herein. The design structures processed and/or generated by design flow 1800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1800 may vary depending on the type of representation being designed. For example, a design flow 1800 for building an application specific IC (ASIC) may differ from a design flow 1800 for designing a standard component or from a design flow 1800 for instantiating the design into a programmable array, for example a programmable gate array (PGA) or a field programmable gate array (FPGA) offered by Altera® Inc. or Xilinx® Inc.

FIG. 18 illustrates multiple such design structures including an input design structure 1820 that is preferably processed by a design process 1810. Design structure 1820 may be a logical simulation design structure generated and processed by design process 1810 to produce a logically equivalent functional representation of a hardware device. Design structure 1820 may also or alternatively comprise data and/or program instructions that when processed by design process 1810, generate a functional representation of the physical structure of a hardware device. Whether representing functional and/or structural design features, design structure 1820 may be generated using electronic computer-aided design (ECAD) such as implemented by a core developer/designer. When encoded on a machine-readable data transmission, gate array, or storage medium, design structure 1820 may be accessed and processed by one or more hardware and/or software modules within design process 1810 to simulate or otherwise functionally represent an electronic component, circuit, electronic or logic module, apparatus, device, or system such as those shown herein. As such, design structure 1820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1810 preferably employs and incorporates hardware and/or software modules for synthesizing, translating, or otherwise processing a design/simulation functional equivalent of the components, circuits, devices, or logic structures shown herein to generate a netlist 1880 which may contain design structures such as design structure 1820. Netlist 1880 may comprise, for example, compiled or otherwise processed data structures representing a list of wires, discrete components, logic gates, control circuits, I/O devices, models, etc. that describes the connections to other elements and circuits in an integrated circuit design. Netlist 1880 may be synthesized using an iterative process in which netlist 1880 is resynthesized one or more times depending on design specifications and parameters for the device. As with other design structure types described herein, netlist 1880 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1810 may include hardware and software modules for processing a variety of input data structure types including netlist 1880. Such data structure types may reside, for example, within library elements 1830 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1840, characterization data 1850, verification data 1860, design rules 1870, and test data files 1885 which may include input test patterns, output test results, and other testing information. Design process 1810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1810 without deviating from the scope and spirit of the invention. Design process 1810 may also include modules for performing standard circuit design processes such as timing analysis, verification, design rule checking, place and route operations, etc.

Design process 1810 employs and incorporates logic and physical design tools such as HDL compilers and simulation model build tools to process design structure 1820 together with some or all of the depicted supporting data structures along with any additional mechanical design or data (if applicable), to generate a second design structure 1890. Design structure 1890 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1820, design structure 1890 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1890 may comprise a compiled, executable HDL simulation model that functionally simulates the devices shown herein.

Design structure 1890 may also employ a data format used for the exchange of layout data of integrated circuits and/or symbolic data format (e.g., information stored in a GDSII (GDS2), GL1, OASIS, map files, or any other suitable format for storing such design data structures). Design structure 1890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1890 may then proceed to a stage 1895 where, for example, design structure 1890: proceeds to tape-out, is released to manufacturing, is released to a mask house, is sent to another design house, is sent back to the customer, etc.

As has been described, in at one embodiment, a memory controller provides access to a system memory of a data processing system including a system interconnect fabric coupling a plurality of processing units to the memory controller. The memory controller receives, from the system interconnect fabric via a first interface, a first read request by which a processing unit among the plurality of processing units requests a copy of a requested data granule. Based on receipt of the first read request via the first interface, the memory controller transmits a second read request via a second interface to initiate access of the requested data granule from a system memory coupled to the memory controller. Based on a determination to schedule accelerated data delivery and receipt by the memory controller via the second interface of a data scheduling indication that indicates a timing of future delivery of the requested data granule, the memory controller, prior to receipt via the second interface of the requested data granule, requests permission to transmit the requested data granule on the system interconnect fabric. Based on receipt of the requested data granule via the second interface at the timing indicated by the data scheduling indication and a grant of the permission to transmit the requested data granule, the memory controller initiates transmission of the requested data granule on the system interconnect fabric via the first interface and transmits, on the system interconnect fabric, an error indication for the requested data granule.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes signal media per se, transitory propagating signals per se, and energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a system interconnect fabric coupling a plurality of processing units to a memory controller, the method comprising:
the memory controller receiving, from the system interconnect fabric via a first interface, a first read request by which a processing unit among the plurality of processing units requests a copy of a requested data granule;
based on receipt of the first read request via the first interface, the memory controller transmitting a second read request via a second interface to initiate access of the requested data granule from a system memory coupled to the memory controller;
based on a determination to schedule accelerated data delivery and receipt by the memory controller via the second interface of a data scheduling indication that indicates a timing of future delivery of the requested data granule, the memory controller, prior to receipt via the second interface of the requested data granule, requesting permission to transmit the requested data granule on the system interconnect fabric; and
based on receipt of the requested data granule via the second interface at the timing indicated by the data scheduling indication and a grant of the permission to transmit the requested data granule, the memory controller initiating transmission of the requested data granule on the system interconnect fabric via the first interface and transmitting, on the system interconnect fabric, an error indication for the requested data granule.

2. The method of claim 1, and further comprising:
the memory controller determining, based on an error history for data granules received on the second interface, whether or not to schedule accelerated data delivery via the first interface; and
the memory controller, based on determining not to schedule accelerated data delivery via the first interface, delaying requesting permission via the first interface to transmit the requested data granule on the system interconnect fabric until at least the requested data granule is received via the second interface.

3. The method of claim 1, and further comprising:
based on receipt of an indication of a data error or link error for the data granule received via the second interface, the memory controller setting the error indication transmitted on the system interconnect fabric to indicate an error in the requested data granule.

4. The method of claim 1, wherein transmitting the second read request via the second interface comprises the memory controller transmitting the second read request to a buffer chip interposed between the memory controller and the system memory.

5. The method of claim 1, wherein:
the memory controller includes a data buffer for buffering data granules received via the second interface; and
the memory controller initiating transmission of the requested data granule on the system interconnect fabric includes the memory controller causing the requested data granule to bypass the data buffer.

6. The method of claim 1, wherein:
the requested data granule is one of a plurality of data granules accessed by the second read request; and
the method further comprises the memory controller receiving the requested data granule via the second interface in a data packet including a beat indication that identifies an ordering of the requested data granule among the plurality of data granules.

7. A memory controller for a system memory in a data processing system including a plurality of processing units coupled to a system interconnect, the memory controller comprising:
a first interface configured to be coupled to the system interconnect fabric of the data processing system;
a second interface configured to be coupled to the system memory;
circuitry configured to perform:
receiving, from the system interconnect fabric via a first interface, a first read request by which a processing unit among the plurality of processing units requests a copy of a requested data granule;
based on receipt of the first read request via the first interface, transmitting a second read request via a second interface to initiate access of the requested data granule from a system memory coupled to the memory controller;
based on a determination to schedule accelerated data delivery and receipt by the memory controller via the second interface of a data scheduling indication that indicates a timing of future delivery of the requested data granule, requesting, prior to receipt via the second interface of the requested data granule, permission to transmit the requested data granule on the system interconnect fabric; and
based on receipt of the requested data granule via the second interface at the timing indicated by the data scheduling indication and a grant of the permission to transmit the requested data granule, initiating transmission of the requested data granule on the system interconnect fabric via the first interface and transmitting, on the system interconnect fabric, an error indication for the requested data granule.

8. The memory controller of claim 7, wherein the circuitry is further configured to perform:
   determining, based on an error history for data granules received on the second interface, whether or not to schedule accelerated data delivery via the first interface; and
   based on determining not to schedule accelerated data delivery via the first interface, delaying requesting permission via the first interface to transmit the requested data granule on the system interconnect fabric until at least the requested data granule is received via the second interface.

9. The memory controller of claim 7, wherein the circuitry is further configured to perform:
   based on receipt of an indication of a data error or link error for the data granule received via the second interface, setting the error indication transmitted on the system interconnect fabric to indicate an error in the requested data granule.

10. The memory controller of claim 7, wherein transmitting the second read request via the second interface comprises the memory controller transmitting the second read request to a buffer chip interposed between the memory controller and the system memory.

11. The memory controller of claim 7, wherein:
    the memory controller includes a data buffer for buffering data granules received via the second interface; and
    initiating transmission of the requested data granule on the system interconnect fabric includes the memory controller causing the requested data granule to bypass the data buffer.

12. The memory controller of claim 7, wherein:
    the requested data granule is one of a plurality of data granules accessed by the second read request; and
    the circuitry is further configured to perform receiving the requested data granule via the second interface in a data packet including a beat indication that identifies an ordering of the requested data granule among the plurality of data granules.

13. A memory system, comprising:
    a memory controller in accordance with claim 7;
    a buffer chip coupled to the second interface of the memory controller; and
    the system memory coupled to the buffer chip.

14. A data processing system, comprising:
    a memory controller in accordance with claim 7;
    a plurality of processing units; and
    a system interconnect fabric coupling the memory controller and the plurality of processing units.

15. A computer-readable storage device comprising a design structure for designing, manufacturing, or testing an integrated circuit, the design structure including:
    a memory controller for a system memory in a data processing system including a plurality of processing units coupled to a system interconnect, the memory controller including:
    a first interface configured to be coupled to the system interconnect fabric of the data processing system;
    a second interface configured to be coupled to the system memory;
    circuitry configured to perform:
       receiving, from the system interconnect fabric via a first interface, a first read request by which a processing unit among the plurality of processing units requests a copy of a requested data granule;
       based on receipt of the first read request via the first interface, transmitting a second read request via a second interface to initiate access of the requested data granule from a system memory coupled to the memory controller;
       based on a determination to schedule accelerated data delivery and receipt by the memory controller via the second interface of a data scheduling indication that indicates a timing of future delivery of the requested data granule, requesting, prior to receipt via the second interface of the requested data granule, permission to transmit the requested data granule on the system interconnect fabric; and
       based on receipt of the requested data granule via the second interface at the timing indicated by the data scheduling indication and a grant of the permission to transmit the requested data granule, initiating transmission of the requested data granule on the system interconnect fabric via the first interface and transmitting, on the system interconnect fabric, an error indication for the requested data granule.

16. The computer-readable storage device of claim 15, wherein the circuitry is further configured to perform:
    determining, based on an error history for data granules received on the second interface, whether or not to schedule accelerated data delivery via the first interface; and
    based on determining not to schedule accelerated data delivery via the first interface, delaying requesting permission via the first interface to transmit the requested data granule on the system interconnect fabric until at least the requested data granule is received via the second interface.

17. The computer-readable storage device of claim 15, wherein the circuitry is further configured to perform:
    based on receipt of an indication of a data error or link error for the data granule received via the second interface, setting the error indication transmitted on the system interconnect fabric to indicate an error in the requested data granule.

18. The computer-readable storage device of claim 15, wherein transmitting the second read request via the second interface comprises the memory controller transmitting the second read request to a buffer chip interposed between the memory controller and the system memory.

19. The computer-readable storage device of claim 15, wherein:
    the memory controller includes a data buffer for buffering data granules received via the second interface; and
    initiating transmission of the requested data granule on the system interconnect fabric includes the memory controller causing the requested data granule to bypass the data buffer.

* * * * *